(12) United States Patent
Garcia

(10) Patent No.: US 11,899,139 B2
(45) Date of Patent: Feb. 13, 2024

(54) PHOTONIC DEVICES WITH REDUNDANT COMPONENTS AND THEIR APPLICATIONS

(71) Applicant: Intel Corporation, Santa Clara, CA (US)

(72) Inventor: Jason Garcia, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 398 days.

(21) Appl. No.: 16/577,906

(22) Filed: Sep. 20, 2019

(65) Prior Publication Data

US 2020/0011979 A1    Jan. 9, 2020

(51) Int. Cl.
*G01S 7/497*    (2006.01)

(52) U.S. Cl.
CPC .................................. *G01S 7/497* (2013.01)

(58) Field of Classification Search
None
See application file for complete search history.

(56) References Cited

U.S. PATENT DOCUMENTS

| 6,393,370 | B1 * | 5/2002 | Soika | G01S 7/52004 |
| | | | | 702/33 |
| 6,545,286 | B1 * | 4/2003 | Ross | G01C 13/00 |
| | | | | 250/573 |
| 9,606,539 | B1 * | 3/2017 | Kentley | G08G 1/005 |
| 2001/0017724 | A1 * | 8/2001 | Miyamoto | H04B 10/5051 |
| | | | | 398/128 |
| 2002/0099481 | A1 * | 7/2002 | Mori | G01C 21/12 |
| | | | | 318/587 |
| 2007/0039030 | A1 * | 2/2007 | Romanowich | H04N 23/90 |
| | | | | 348/E7.071 |
| 2007/0096446 | A1 * | 5/2007 | Breed | B60R 21/239 |
| | | | | 280/735 |

(Continued)

FOREIGN PATENT DOCUMENTS

KR    10-2019-007199 A    6/2019

OTHER PUBLICATIONS

International Search Report and Written Opinion dated Oct. 21, 2020 for International Patent Application PCT/US2020/039420, 14 pages.

*Primary Examiner* — Arleen M Vazquez
*Assistant Examiner* — Brandon J Becker
(74) *Attorney, Agent, or Firm* — Schwabe, Williamson & Wyatt, P.C.

(57) ABSTRACT

Embodiments include apparatuses, methods, and systems for a photonic device including a first optical component, a second optical component, and a third component, where the first optical component or the second optical component is a redundant component of the photonic device. When the first optical component is enabled, the first optical component is to provide a first input to the third component, or to receive a second input from the third component. Similarly, when the second optical component is enabled, the second optical component is to provide the first input to the third component, or to receive the second input from the third component. The first optical component and the second optical component are arranged to perform a same function. Only one of the first optical component or the second optical component is enabled at a time. Other embodiments may also be described and claimed.

22 Claims, 13 Drawing Sheets

(56) References Cited

U.S. PATENT DOCUMENTS

| | | | |
|---|---|---|---|
| 2013/0001599 A1 | 1/2013 | Alland | |
| 2013/0315578 A1* | 11/2013 | Arin | G03B 15/08 |
| | | | 396/661 |
| 2015/0029571 A1* | 1/2015 | Steele | G02B 26/108 |
| | | | 359/211.2 |
| 2016/0291136 A1* | 10/2016 | Lindskog | G01S 7/4813 |
| 2017/0124781 A1* | 5/2017 | Douillard | G01S 17/931 |
| 2017/0242095 A1 | 8/2017 | Schuh et al. | |
| 2017/0277166 A1* | 9/2017 | Popa-Simil | G05B 19/4184 |
| 2017/0307736 A1* | 10/2017 | Donovan | G01S 17/89 |
| 2018/0113200 A1* | 4/2018 | Steinberg | G05D 1/024 |
| 2018/0188371 A1 | 7/2018 | Bao et al. | |
| 2019/0065863 A1* | 2/2019 | Luo | G06V 20/56 |
| 2019/0178974 A1* | 6/2019 | Droz | G01S 17/89 |
| 2020/0011979 A1 | 1/2020 | Garcia | |

\* cited by examiner

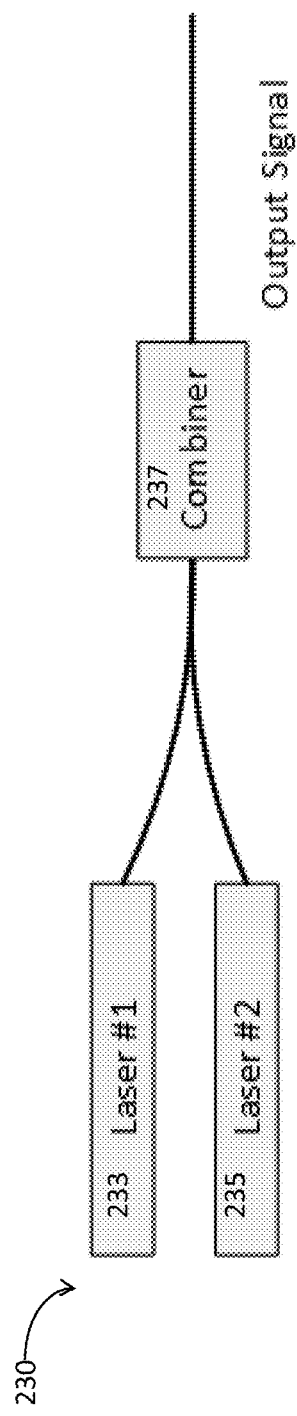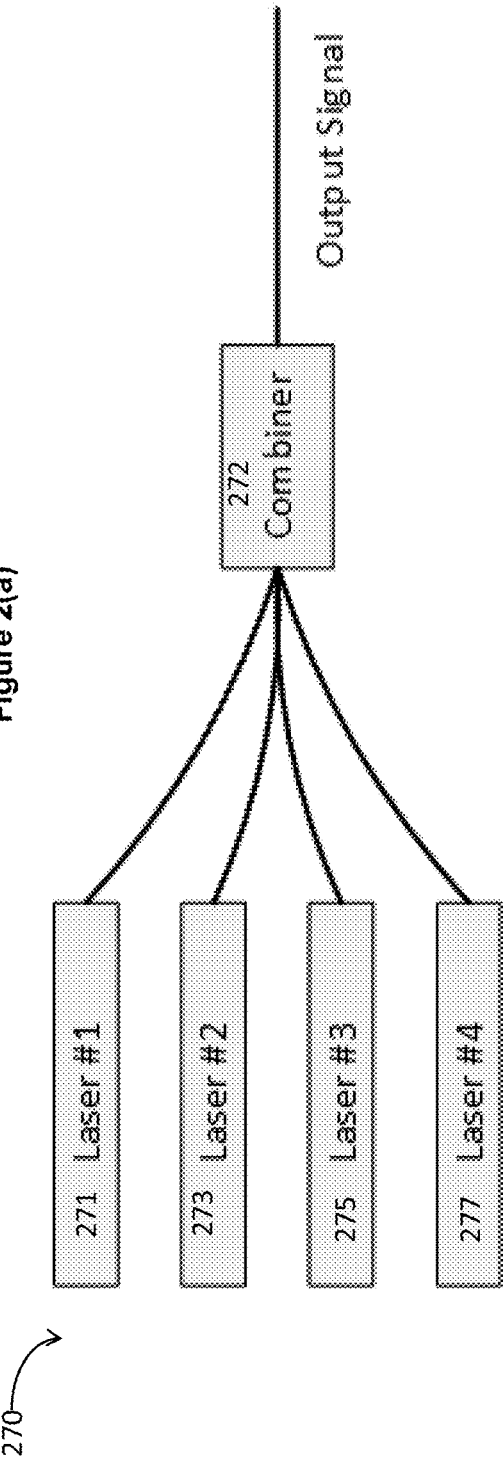
Figure 2(a)
Figure 2(b)

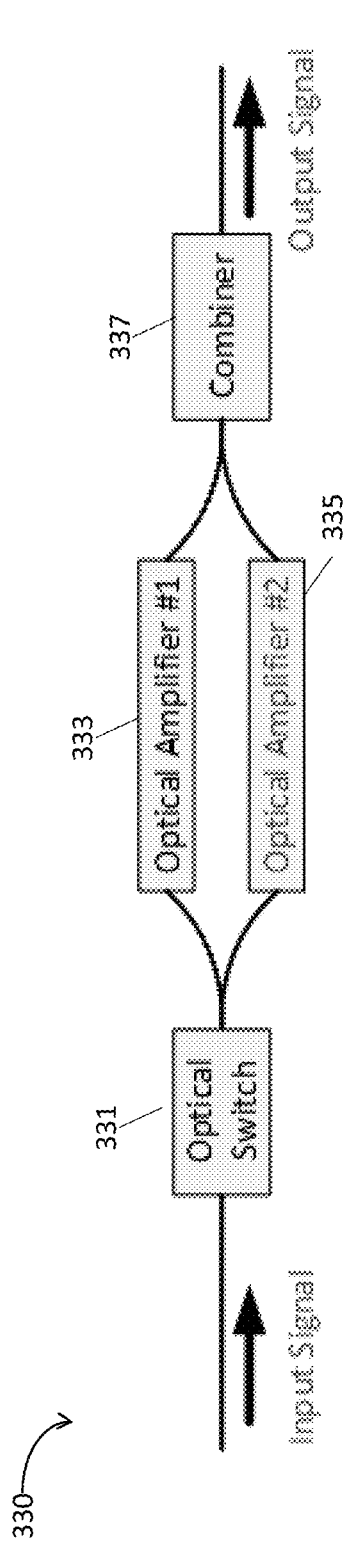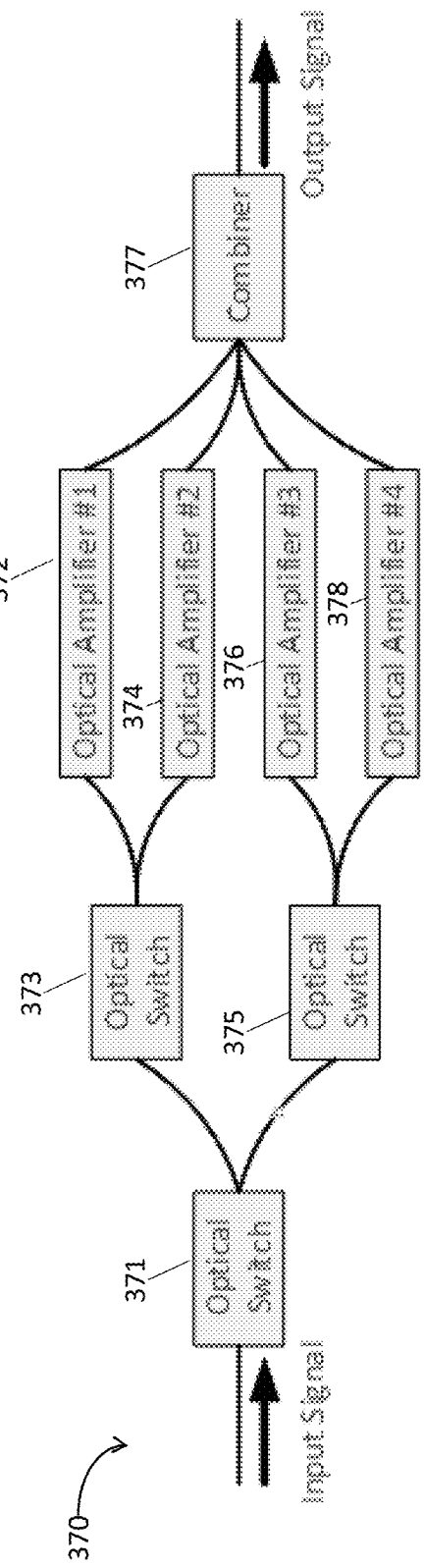
Figure 3(a)
Figure 3(b)

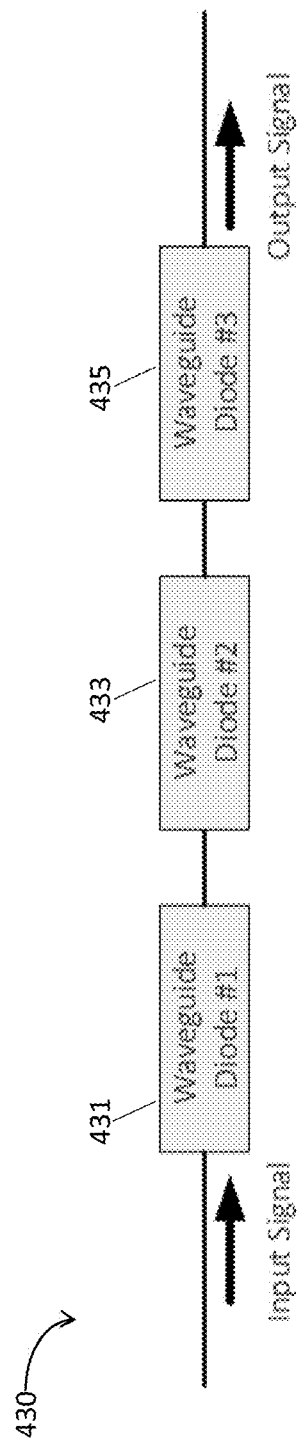

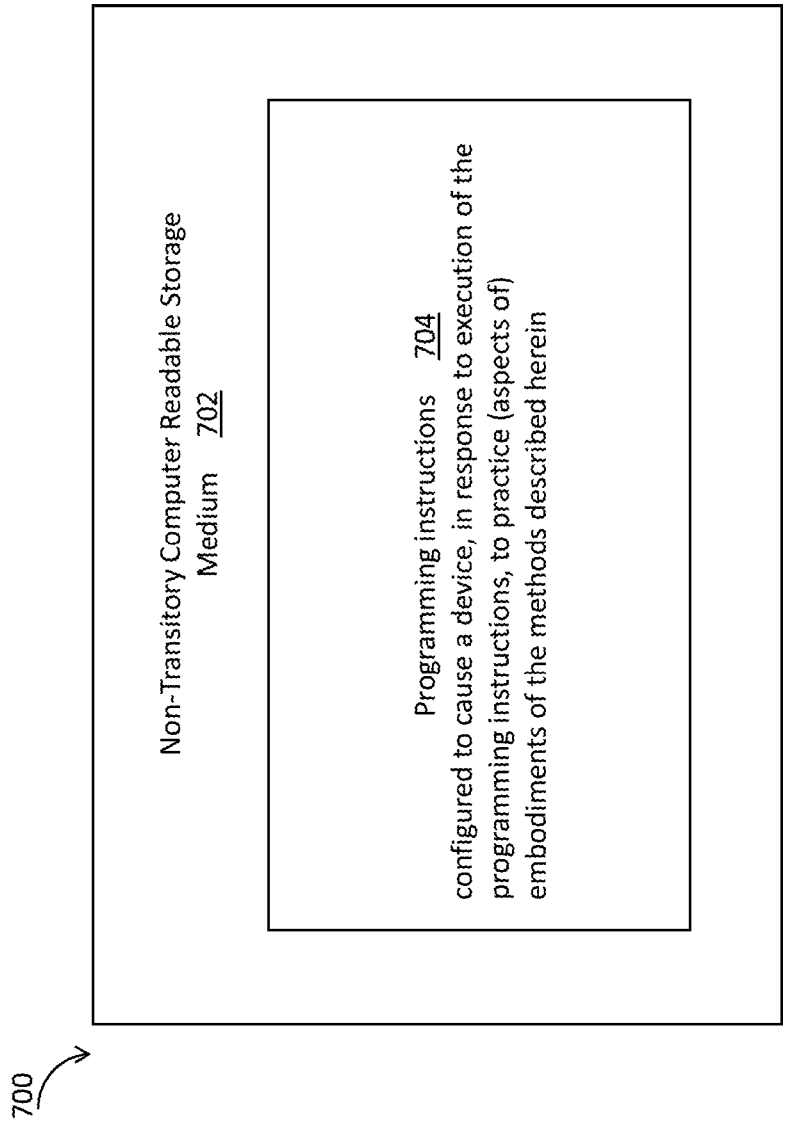

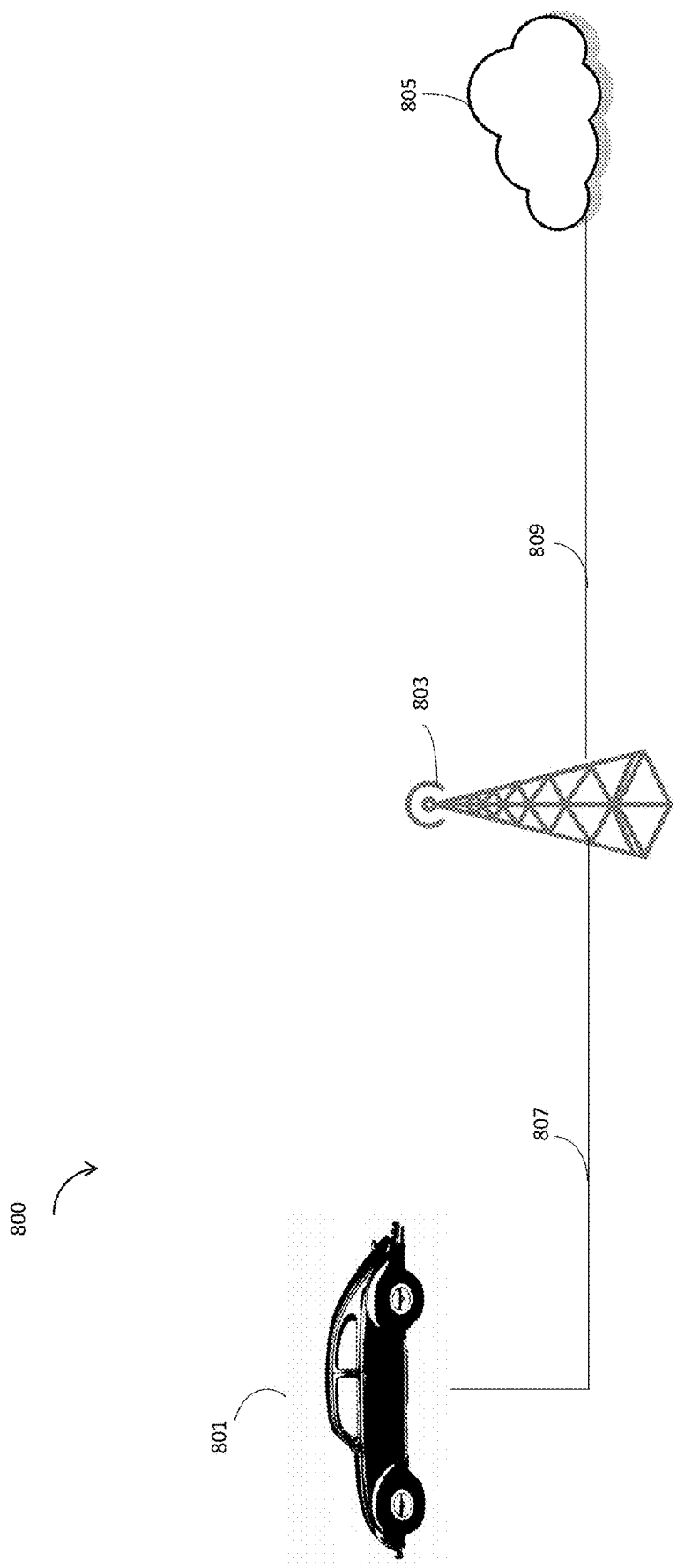

PHOTONIC DEVICES WITH REDUNDANT COMPONENTS AND THEIR APPLICATIONS

FIELD

Embodiments of the present disclosure relate generally to the technical fields of photonic devices and their applications, and more particularly to their applications in computer assisted or autonomous driving vehicles.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Photonic devices, e.g., photonic integrated circuits, have many applications. For example, photonic devices may be considered a promising candidate for next generation interconnects for data center and high performance computing. In addition, photonic devices such as Light Detection and Ranging (LiDAR) sensors are widely used in computer assisted or autonomous driving (CA/AD) vehicles. However, components within a photonic device may have manufacturing defects or degrade over time, resulting in the failure of the photonic device. In a CA/AD vehicle with a LiDAR sensor, the vehicle may lose full field of view when a LiDAR sensor failure occurs. Depending on the implementation, vehicle operation may be impaired or limited until the faulty LiDAR sensor is repaired/replaced.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 2(a)-2(c) illustrate example apparatuses including a photonic device with redundant components, a monitor unit and a control unit for control operations of the photonic device, in accordance with various embodiments.

FIGS. 3(a)-3(c) illustrate example apparatuses including a photonic device with redundant components, a monitor unit and a control unit for control operations of the photonic device, in accordance with various embodiments.

FIGS. 4(a)-4(b) illustrate an example apparatus including a photonic device with redundant components, a monitor unit and a control unit for control operations of the photonic device, in accordance with various embodiments.

FIG. 7 illustrates a storage medium having instructions for practicing operations described with references to FIGS. 1-6, in accordance with various embodiments.

FIG. 8 illustrates an environment in which various embodiments described with references to FIGS. 1-7 may be practiced.

DETAILED DESCRIPTION

Figure 1A:
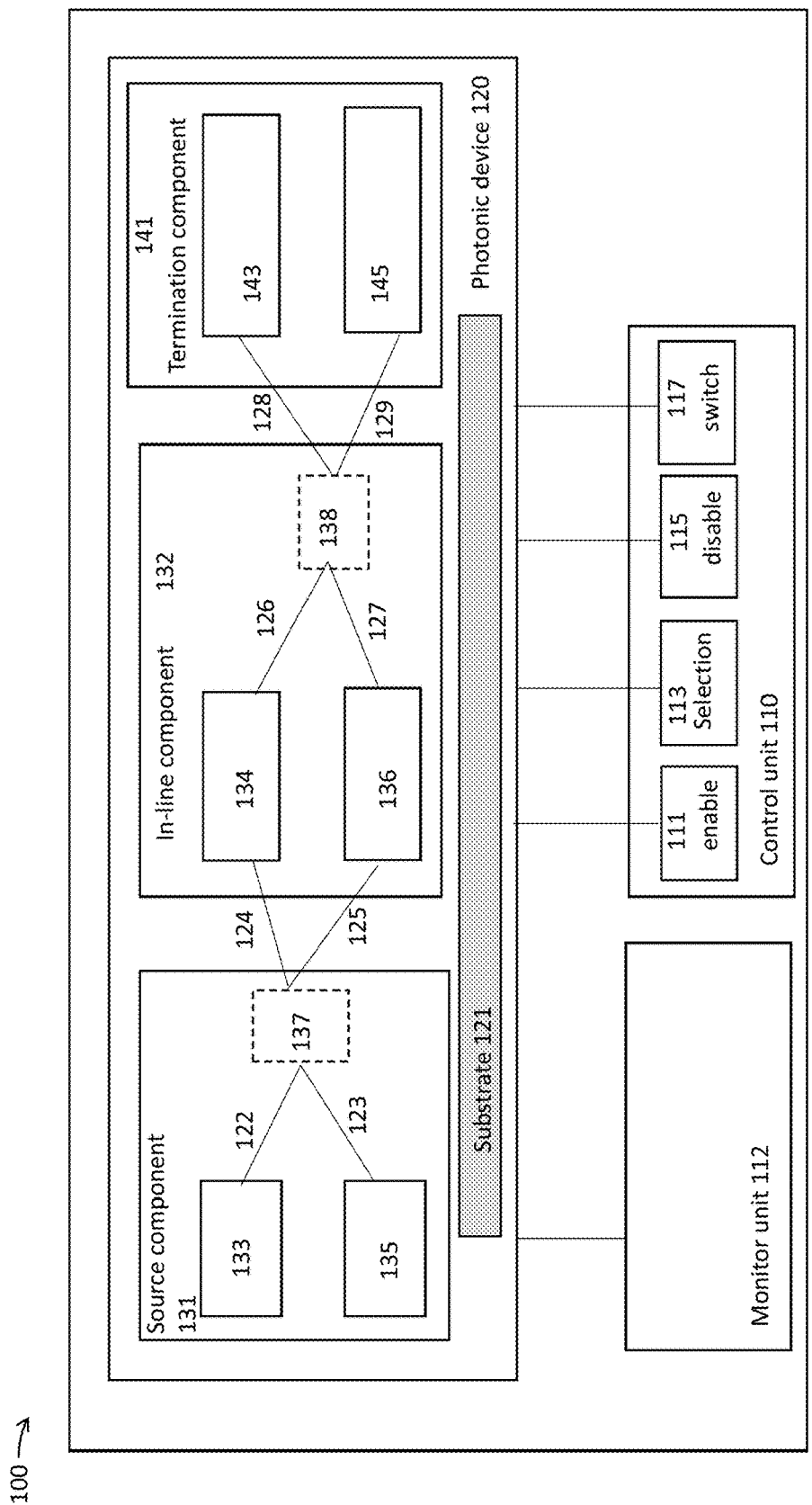
FIG. 1(a) illustrates an example apparatus including a photonic device with redundant components, a monitor unit and a control unit for control operations of the photonic device, in accordance with various embodiments.

Photonic devices may be implemented as photonic integrated circuits or assembled from multiple discrete components on a circuit board. Photonic devices, e.g., Light Detection and Ranging (LiDAR) sensors, may be used in many applications, e.g., in a computer assisted or autonomous driving (CA/AD) vehicle. A CA/AD vehicle may also be referred to as an autonomous car, a driverless car, a self-driving car, a robotic car, or a unmanned ground vehicle, which may be a vehicle that is capable of sensing its environment and navigating without human input for certain functions.

Components within a photonic device may have manufacturing defects or degradation over time, resulting in the failure of the photonic device. In a CA/AD vehicle with a LiDAR sensor, the vehicle may lose full field of view when a sensor failure occurs. Some current CA/AD vehicles may include multiple LiDAR sensors or systems with overlapping fields of view across multiple LiDAR systems to allow the CA/AD vehicle to operate when some LiDAR systems fail. The multiple LiDAR sensors in a CA/AD vehicle with overlapping fields of view may be deemed as a system level redundancy, which results in an increased cost due to the increased numbers of sensors being used. LiDAR sensors typically are the most expensive sensing component within highly autonomous vehicle sensor suites, leading to a significant cost impact. At the photonic device level, a photonic device, e.g., a LiDAR sensor, does not have a mechanism that allows the photonic device to operate at full performance even though some component of the photonic device may be faulty or in a failure state. If a component of a photonic device fails, the entire photonic device or the entire chip is rejected or replaced. In some other current technology, a component failure within a photonic device may lead the photonic device to operate at a reduced performance configuration.

Embodiments herein provide photonic devices with redundant components so that the photonic devices may still operate at a full performance when some components of the photonic devices fail. For example, a LiDAR sensor having redundant sub system components, e.g., lasers, amplifiers, detectors, etc., may still be operational with full performance when some components, e.g., a laser or an amplifier, fail. Hence, embodiments herein provide component level redundancy to reduce system level performance degradation, leading to an increased usable lifespan of the system without the need to provide full system level redundancy, e.g., the use of multiple LiDAR sensors. As a result, embodiments herein may have an extended life time as well as increased component level manufacturing yields. In addition, embodiments herein also provide mechanisms to independently switch operations between redundant components of a photonic device. For example, each redundant component of a photonic device may be independently powered on or off, or with adjusted or different input voltages or currents. Embodiments herein may include monitor logic to monitor one or more operational parameters of one or more optical components of the photonic device to assess degradation and usage of the optical components. Embodiments herein may also include control logic to adaptively balance usage of redundant components to provide equivalent degradation of components over the system lifetime. In addition, the control logic can control failover to remaining active redundant system component(s) in the event of a component failure. Compared to system level redundancy, embodiments herein provide reduced system complexity, reduced system cost, and reduced system size at equivalent or better levels of reliability.

Even though LiDAR sensors in CA/AD vehicles are used as examples in the description herein, embodiments herein may have wide applications for LiDAR sensors used for a broad range of use cases such as robotics, drones, security systems, aerospace, or military applications. Furthermore, embodiments herein may also be used in non-LiDAR photonics applications, e.g., communications laser networking products, optical gyroscopes, photonics based metrologies, etc.

In embodiments, a photonic device includes a first optical component, a second optical component, and a third component, where the first optical component or the second optical component is a redundant component of the photonic device. The first optical component and the second optical component is coupled to the third component. When the first optical component is enabled, the first optical component is to provide a first input to the third component, or to receive a second input from the third component. Similarly, when the second optical component is enabled, the second optical component is to provide the first input to the third component, or to receive the second input from the third component. The first optical component is arranged to perform a function, and the second optical component is arranged to perform the same function. In addition, only one of the first optical component or the second optical component is enabled at a time.

In embodiments, an apparatus for controlling a photonic device includes a monitor unit and a control unit to monitor and control the operations of the photonic device. The photonic device includes a first optical component and a second optical component coupled to a third component. The first optical component or the second optical component is a redundant component of the photonic device. The first optical component is arranged to perform a function, and the second optical component is arranged to perform the same function. When the first optical component or the second optical component is enabled, the enabled one of the first and second optical components is to provide a first input to the third component, or to receive a second input from the third component. Only one of the first optical component or the second optical component is enabled at a time. The monitor unit is to monitor one or more operational parameters of one or more optical components of the photonic device. The control unit is to control operations of the first optical component or the second optical component.

In embodiments, one or more non-transitory computer-readable media include instructions that cause a vehicle onboard unit (OBU) of a CA/AD vehicle, in response to execution of the instructions by the OBU, to perform various operations. For example, the instructions are to cause the OBU to monitor, by a monitor unit, one or more operational parameters of one or more optical components of a LiDAR sensor disposed on the CA/AD vehicle. The LiDAR sensor includes a first optical component and a second optical component coupled to a third component. When the first optical component or the second optical component is enabled, the enabled one of the first and second optical components is to provide a first input to the third component, or to receive a second input from the third component. The first optical component or the second optical component is a redundant component of the LiDAR sensor. The first optical component is arranged to perform a function, and the second optical component is arranged to perform the same function. Only one of the first optical component or the second optical component is enabled at a time. The instructions are further to cause the OBU to control, by a control unit, power or current supplied to the first optical component or the second optical component of the LiDAR sensor, in response to a trigger event received from the monitor unit or from another device coupled to the control unit. The trigger event is related to data about the CA/AD vehicle speed, location, sensor fusion detection data, or weather condition.

In the description to follow, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A or B" and "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

As used hereinafter, including the claims, the term "unit," "engine," "module," or "routine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality.

As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a general purpose processing unit (GPU), a single-core processor, a dual-core processor, a triple-core processor, a quad-core processor, and/or any other device capable of executing or otherwise operating computer-executable instructions, such as program code, software modules, and/or functional processes.

As used herein, the term "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like).

As used herein, the term "computer device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources. Examples of "computer devices", "computer systems", etc. may include cellular phones or smart phones, feature phones, tablet personal computers, wearable computing devices, an autonomous sensors, laptop computers, desktop personal computers, video game consoles, digital media players, handheld messaging devices, personal data assistants, an electronic book readers, augmented reality devices, server computer devices (e.g., stand-alone, rack-mounted, blade, etc.), cloud computing services/systems, network elements, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management Systems (EEMSs), electronic/engine control units (ECUs), vehicle-embedded computer devices (VECDs), autonomous or semi-autonomous driving vehicle (hereinafter, simply ADV) systems, in-vehicle navigation systems, electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or any other like electronic devices. Moreover, the term "vehicle-embedded computer device" may refer to any computer device and/or computer system physically mounted on, built in, or otherwise embedded in a vehicle.

As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host a virtual machine. Furthermore, the term "network element" may describe equipment that provides radio baseband functions for data and/or voice connectivity between a network and one or more users. The term "network element" may be considered synonymous to and/or referred to as a "base station." As used herein, the term "base station" may be considered synonymous to and/or referred to as a node B, an enhanced or evolved node B (eNB), next generation nodeB (gNB), base transceiver station (BTS), access point (AP), roadside unit (RSU), etc., and may describe equipment that provides the radio baseband functions for data and/or voice connectivity between a network and one or more users. As used herein, the terms "vehicle-to-vehicle" and "V2V" may refer to any communication involving a vehicle as a source or destination of a message. Additionally, the terms "vehicle-to-vehicle" and "V2V" as used herein may also encompass or be equivalent to vehicle-to-infrastructure (V2I) communications, vehicle-to-network (V2N) communications, vehicle-to-pedestrian (V2P) communications, or V2X communications As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

Figure 1B:
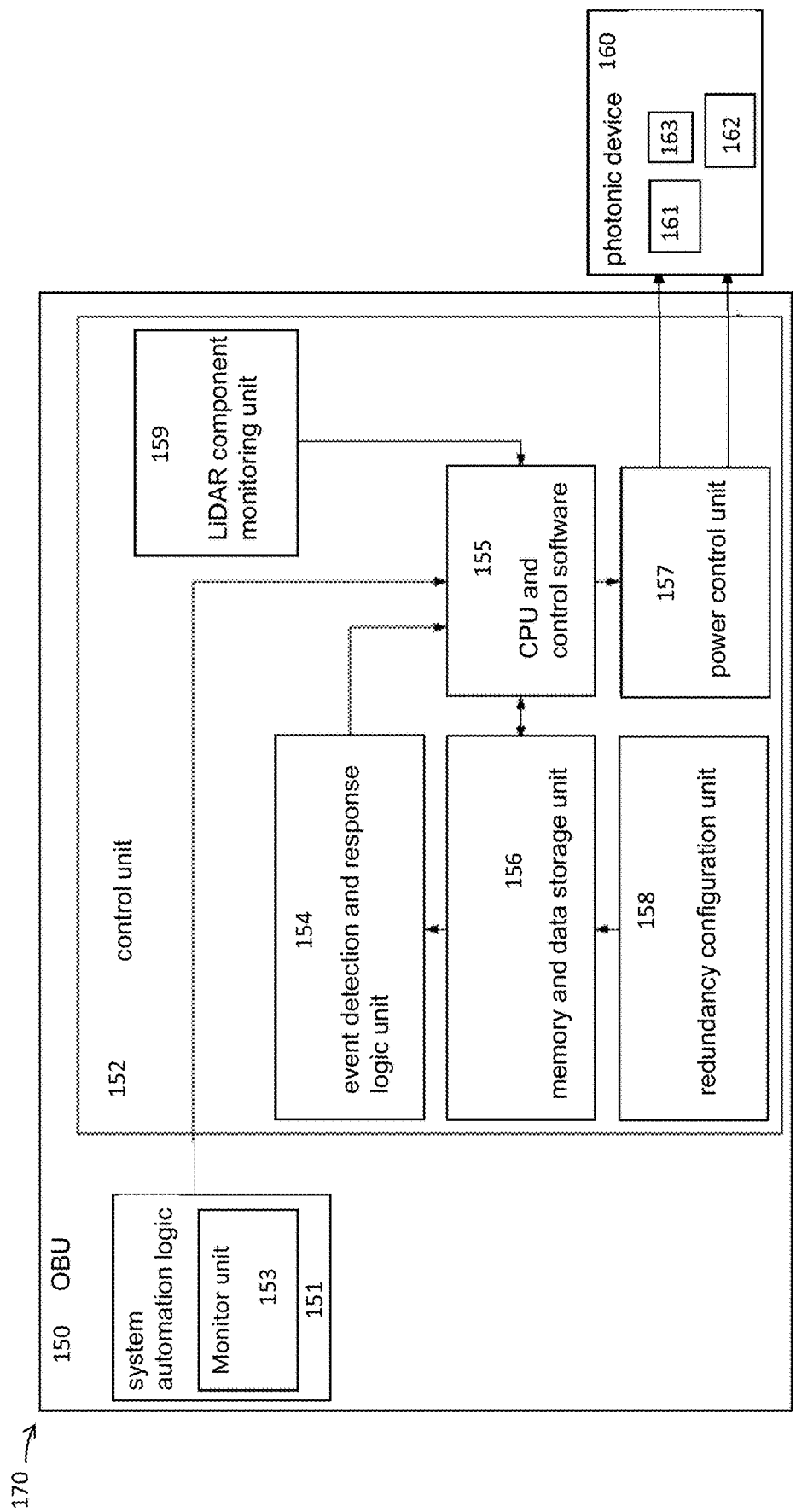
FIG. 1(b) illustrates an example computer assisted or autonomous driving (CA/AD) system, incorporated with a photonic device with redundant components, a monitor unit, and a control unit, in accordance with various embodiments.

FIG. 1(a) illustrates an example apparatus 100 including a photonic device 120 with redundant components, a monitor unit 112 and a control unit 110 for control operations of the photonic device 120, in accordance with various embodiments. FIG. 1(b) illustrates an example computer assisted or autonomous driving (CA/AD) system 170, incorporated with a photonic device 160 with redundant components, a monitor unit 153, and a control unit 152, in accordance with various embodiments.

In embodiments, the apparatus 100 includes the photonic device 120, the monitor unit 112, and the control unit 110 coupled with each other as shown. The photonic device 120 includes multiple components, such as source components 131, in-line components 132, and termination components 141. A component within the photonic device 120 may be an optical component or a non-optical component. A source component, e.g., the source components 131, may be a source to provide an input for other components of the photonic device 120. A termination component, e.g., the termination components 141, may be a sink to receive an input from other components of the photonic device 120 without providing any output. An in-line component, e.g., the in-line components 132, may receive an input and provide an output. In embodiments, various optical components of the photonic device 120 may be included in an integrated circuit disposed on a substrate 121. In some other embodiments, the photonic device 120 may include multiple discrete components formed on different substrates and assembled together on a circuit board. The photonic device 120 may be a Light Detection and Ranging (LiDAR) sensor, a laser networking product, an optical gyroscope, a photonics-based metrology, or other photonic device. The photonic device 120 may be disposed in a computer assisted or autonomous driving (CA/AD) vehicle, a robot, a drone, a security system, or any other system that may use a photonic device.

In embodiments, the photonic device 120 may include redundant components. For example, the photonic device 120 includes a first optical component, a second optical component, and a third component. The first optical component or the second optical component is a redundant component of the photonic device 120. The first optical component and the second optical component may be coupled in parallel or in sequence. Together they may be referred as an array of redundant components. For example, a first optical component and a second optical component that is redundant to the first optical component may refer to a first optical component 133 and a second optical component 135, a first optical component 134 and a second optical component 136, or a first optical component 143 and a second optical component 145, as shown in FIG. 1(a). The first optical component is arranged to perform a function, the second optical component is arranged to perform the same function. In embodiments, the first optical component or the second optical component may include a laser, an amplifier, an optical collimator, an optical switch, an optical discriminator, an optical source signal component, an inline optical component, an optical signal termination component, a photo detector, or a photo diode. In some other embodiments, the photonic device 120 further includes one or more additional optical components to perform the function of the first optical component.

In more detail, the source components 131 includes the first optical component 133, the second optical component 135, and a third component 137. The first optical component 133 or the second optical component 135 is a redundant component and performs the same function. Hence, if one of the first optical component 133 or the second optical component 135 fails to perform its function, the remaining component may perform the same function, and the source components 131 is still operational with full performance. The first optical component 133 and the second optical component 135 are coupled to the third component 137. The third component 137 may be optional in the source components 131. When the third component 137 does not exist in the source components 131, the first optical component 133 or the second optical component 135 is coupled to a same component in the next section of the photonic device 120.

Similarly, the in-line components 132 includes the first optical component 134, the second optical component 136, and a third component 138. The first optical component 134 or the second optical component 136 is a redundant component and performs the same function. Hence, if one of the first optical component 134 or the second optical component 136 fails to perform its function, the remaining component may perform the same function, and the in-line components 132 is still operational with full performance. The first optical component 134 and the second optical component 136 are coupled to the third component 138. The third component 138 may be optional in the in-line components 132. When the third component 138 does not exist in the in-line components 132, the first optical component 134 or the second optical component 136 is coupled to a same component in the next section of the photonic device 120.

Furthermore, the termination components 141 includes the first optical component 143, and the second optical component 145. The first optical component 143 or the second optical component 145 is a redundant component and performs the same function. Hence, if one of the first optical component 143 or the second optical component 145 fails to perform its function, the remaining component may perform the same function, and the termination components 141 is still operational with full performance.

In embodiments, when the first optical component, e.g., the first optical component 133, is enabled, the first optical component is to provide an input, e.g., an input 122, to the third component, e.g., the third component 137. Similarly, when the second optical component, e.g., the second optical component 135, is enabled, the second optical component, e.g., the second optical component 135, is to provide an input, e.g., an input 123, to the third component, e.g., the third component 137. The input 122 and the input 123 contain the same information or signal, and is viewed as a same input to the third component 137. A component is enabled when the component is ready to perform or performing its designed functions. A component is disabled when the component is not ready or not performing its designed functions. A disabled component may perform a function different from the designed functions. For example, a disabled optical component may not perform designed optical functions, but may still pass through light.

In embodiments, only one of the first optical component 133 or the second optical component 135 is enabled at a time. Similarly, only one of the first optical component 134 or the second optical component 136, or only one of first optical component 143 or the second optical component 145 is enabled at a time. For example, the first optical component 133 is enabled and the second optical component 135 is disabled at a first time, and the first optical component 133 is disabled and the second optical component 135 is enabled at a second time different from the first time. As another example, the first optical component 133 is enabled when the second component 135 fails to perform the function. In some other embodiments, the photonic device 120 further includes one or more additional optical components to perform the function of the first optical component 133, when at least one of the one or more additional optical components is enabled. In some embodiments, all except one of the first optical component 133, the second optical component 135, and the one or more additional optical components are disabled at a time. The operational principles described herein for the first optical component 133 and the second optical component 135 are equally applicable to other redundant components, e.g., the first optical component 134 and the second optical component 136, or the first optical component 143 and the second optical component 145.

In embodiments, the monitor unit 112 is arranged to monitor one or more operational parameters of one or more optical components of the photonic device, while the control unit 110 is to control operations of the first optical component or the second optical component that is redundant to the first optical component. The one or more operational parameters may include a duration of the one or more optical components being enabled, a temperature of the one or more optical components, a power level of the one or more optical components, or a current value of the one or more optical components. In addition, the monitor unit 112 may be arranged to assess degradation of the first optical component or the second optical component that is redundant to the first optical component.

In embodiments, the control unit 110 is to control operations of the first optical component or the second optical component by controlling power or current supplied to the first optical component or the second optical component, enabling (shown as operation 111) the first optical component or the second optical component, disabling (shown as operation 115) the first optical component or the second optical component, or selecting (shown as operation 113) one of the first optical component or the second optical component to be enabled. The control unit is further to switch operations (shown as operation 117) of the first optical component and the second optical component by enabling the first optical component and disabling the second optical component, or disabling the first optical component and enabling the second optical component.

There may be other operations the control unit 110 may be performed, not shown in FIG. 1(*a*). For example, the control unit 110 is further to adaptively balance usage of the first optical component and the second optical component to provide substantially equivalent degradation of the first optical component and the second optical component over a time period. In addition, the control unit 110 may further detect a failure state of the first optical component or the second optical component, and to enable the second optical component when detecting the failure state of the first optical component.

In some embodiments, the control unit 110 is further to control power or current supplied to the first optical component or the second optical component, in response to a trigger event received from the monitor unit or from another device coupled to the control unit. In some embodiments, the photonic device 120 is a LiDAR sensor disposed on a CA/AD vehicle, and the trigger event is related to data about the CA/AD vehicle speed, location, sensor fusion detection data, or weather condition. The apparatus 100 may be a vehicle onboard unit (OBU) disposed in the CA/AD vehicle. In some embodiments, the apparatus 100 may be the CA/AD vehicle comprising an OBU.

FIG. 1(*b*) illustrates an example computer assisted or autonomous driving (CA/AD) system 170, incorporated with a photonic device 160 with redundant components, a monitor unit 153, and a control unit 152, in accordance with various embodiments. The photonic device 160, the monitor unit 153, and the control unit 152 may be an example of the photonic device 120, the monitor unit 112, and the control unit 110 as shown in FIG. 1(*a*). The photonic device 160 may be a LiDAR sensor disposed on the CA/AD system 170. The monitor unit 153, and the control unit 152 may be a part of an OBU 150 disposed in a CA/AD vehicle. In embodiments, the CA/AD system 170 may be for a selected one of a commercial truck, a light duty car, a sport utility vehicle (SUV), a light vehicle, a heavy duty vehicle, a pickup truck, a van, a car, a motorcycle, or any other vehicle.

In embodiments, the photonic device 160 may be a LiDAR sensor disposed on OBU the CA/AD system 170, and may include a first optical component 161 and a second optical component 162, both coupled to a third component 163. The first optical component 161 or the second optical component 162 is a redundant component of the photonic device. The first optical component 161 is arranged to perform a function, and the second optical component 162 is arranged to perform the same function. Only one of the first optical component 161 or the second optical component 162 is enabled at a time. When the first optical component 161 is enabled, the first optical component 161 is to provide a first input to the third component 163, or to receive a second input from the third component 163. When the second optical component 162 is enabled, the second optical component 162 is to provide the first input to the third component 163, or to receive the second input from the third component 163.

Figure 2C:
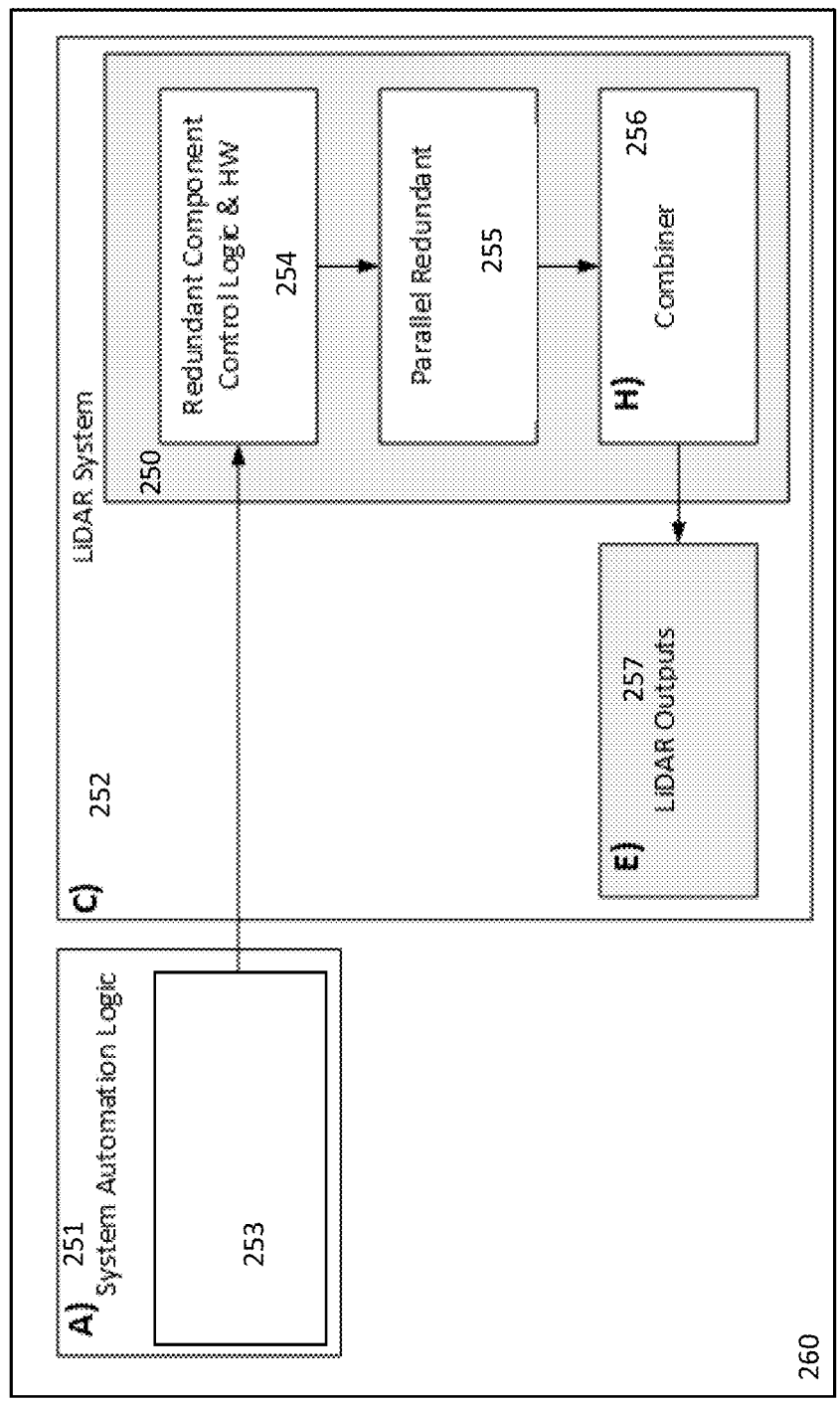

In embodiments, the first optical component 161 and the second optical component 162 may be lasers, amplifiers, photo diodes, or any other optical components. More details are shown in FIGS. 2(*a*)-2(*c*), FIGS. 3(*a*)-3(*c*), FIGS. 4(*a*)-4(*b*), or FIGS. 5(*a*)-5(*b*). Lasers, amplifiers, or photo diodes are active photonics components/devices having performance degradation or failure over time that limit product lifetimes. The rate of degradation and failure vary widely depending on factors such as materials, process technology, use conditions, photonic device type, etc. The redundant optical component may offset the yield and reliability risks for these components by providing photonic device level redundancy as well as supporting system controls to implement the redundancy at the system level.

In embodiments, the OBU 150 is disposed in a CA/AD vehicle, and includes the monitor unit 153 and the control unit 152. The monitor unit 153 may be a part of a system automation logic 151. The control unit 152 is responsible for managing the usage of the redundant components. The control unit 152 may include various components, e.g., an event detection and response logic unit 154, a CPU and control software 155, a memory and data storage unit 156, a power control unit 157, a redundancy configuration unit 158, and a LiDAR component monitoring unit 159. The monitor unit 153 may monitor vehicle data (speed, sensor fusion detection data, weather conditions). The LiDAR component monitoring unit 159 may monitor voltage or current data for redundant components (active usage duration, power level, device status, etc.). The event detection and response logic unit 154 is to detect events that would trigger rotating usage of the redundant components within the LiDAR. Detection of event triggers may be based on simple rules, mathematical models, artificial intelligence (AI)/machine learning based models. Inputs to the event trigger logic may include configured settings/thresholds as well as vehicle and component monitor data. The power control unit 157 is to modify voltage/power/current levels supplied to redundant components (including turning devices off), powering or activating, or switching the redundant components. Components within the LiDAR may fail as a result of manufacturing defects and/or due to time based failure modes. Once a component is detected to be in a failure state, the component can be fully disabled to allow the system to continue functioning at full performance.

The monitor unit 153 is to monitor events and system data for the CA/AD vehicle to determine when it is time to switch to a different redundant component within the LiDAR. The decision to switch may be for various purposes, e.g., to balance the aging across all the components within the array of redundant components. In some embodiments, there may be only one of the redundant components active at a time. In some other embodiments, there may be multiple redundant components being active in parallel at a time, while at least one component is off to allow for redundancy. The redundant components within the LiDAR may be coupled in parallel or serial configuration.

As an example, the monitor unit 153 may detect time periods for the CA/AD vehicle where full performance of the LiDAR isn't required. For example, when the CA/AD vehicle is stopped, the CA/AD vehicle automation logic 151 may make path decisions focused more on nearer distance objects instead of objects that are 250 meters away. Hence, when the monitor unit 153 detects the CA/AD vehicle is at a stop, the control unit 152 may reduce the device bias or laser output during the time the CA/AD vehicle is stopped for closer range monitoring. The reduction of bias/power during these periods correspondingly reduces the aging rate during these timeframes which contribute to extending the usable life of the sensor. The LiDAR may resume full power/long rang scanning as the vehicle resumes movement. Hence, the output of the LiDAR is modulated based on the speed of the vehicle, which may be detected by the monitor unit 153.

FIGS. 2(*a*)-2(*c*) illustrate example apparatuses including a photonic device 230 or a photonic device 270 with redundant components, a monitor unit 253 and a control unit 252 for control operations of the photonic device, in accordance with various embodiments. The photonic device 230, or the photonic device 270, the monitor unit 253, and the control unit 252 may be an example of the photonic device 120, the monitor unit 112, and the control unit 110 as shown in FIG. 1(*a*).

In embodiments, as shown in FIG. 2(*a*), the photonic device 230 includes a laser 233, which is a first optical component, and a laser 235, which is a second optical component, both coupled in parallel to a third component, which is a combiner 237. Both the laser 233 and the laser 235 are source elements to provide input to other components. The combiner 237 is further coupled to other components of the photonic device 230. The laser 233 and the laser 235 are examples of redundant components, e.g., the optical component 133 and the optical component 135, as shown in FIG. 1(*a*). The laser 233 or the laser 235 is a redundant component of the photonic device 230, performing the same functions. Only one of the laser 233 or the laser 235 is enabled at a time. When the laser 233 is enabled, the laser 233 is to provide an input to the combiner 237. When the laser 235 is enabled, the laser 235 is to provide the input to the combiner 237.

In embodiments, as shown in FIG. 2(*b*), the photonic device 270 includes a laser 271, which is a first optical component, and a laser 273, which is a second optical component, both coupled to a combiner 272. In addition, the photonic device 270 further includes a laser 275 and a laser 277, which are all coupled to the combiner 272. The combiner 272 is further coupled to other components of the photonic device 270. The laser 271, the laser 273, the laser 275, and the laser 277, are examples of redundant components, e.g., the optical component 133, and the optical component 135, as shown in FIG. 1(*a*). The laser 271, the laser 273, the laser 275, and the laser 277 perform the same functions. In some embodiments, only one of the laser 271, the laser 273, the laser 275, and the laser 277 is enabled at a time. In some other embodiments, there may be multiple lasers being enabled. For example, all but except one of the laser 271, the laser 273, the laser 275, and the laser 277 may be enabled.

In embodiments, when a laser, e.g., the laser 233 or the laser 273, is defective, the defective laser can be disabled and the photonic device 230 or the photonic device 270 still performs the designed functions with full performance. The system using the photonic device 230 or the photonic device 270 continues to operate with full performance. In some other embodiments, the multiple redundant components may be enabled in turn, to reduce the utilization of one component, which leads to extended life for each component and for the system using the photonic device 230 or the photonic device 270.

In embodiments, as shown in FIG. 2(*c*), the monitor unit 253 and the control unit 252 may be a part of an OBU 260 disposed in a CA/AD vehicle. The monitor unit 253 may be a part of a system automation logic 251. The monitor unit 253 is to monitor events and system data for the CA/AD vehicle, e.g., speed, sensor fusion detection data, weather conditions. The control unit 252 is responsible for managing the usage of the redundant components, e.g., control operations of the combiner 237 or the combiner 272. For example, the control unit 252 includes a LiDAR system redundancy control 250 and a LiDAR output unit 257. The LiDAR system redundancy control 250 includes a redundant component control logic 254, a redundant component array control 255, and a combiner control 256. The redundant component control logic 254 is to select one or more of the redundant components to be enabled. The redundant component array control 255 is to configure the selected component to be enabled. The combiner control 256 is to control the operation of the combiner. The LiDAR output unit 257 is to control the output of the combiner.

FIGS. 3(*a*)-3(*c*) illustrate example apparatuses including a photonic device 330 or a photonic device 370 with redundant components, a monitor unit 353 and a control unit 352 for control operations of the photonic device, in accordance with various embodiments. The photonic device 330, or the photonic device 370, the monitor unit 353, and the control unit 352 may be an example of the photonic device 120, the monitor unit 112, and the control unit 110 as shown in FIG. 1(*a*).

In embodiments, as shown in FIG. 3(*a*), the photonic device 330 includes an optical switch 331, an optical amplifier 333, an optical amplifier 335, and a combiner 337, coupled with other. The optical amplifier 333 may be a first optical component, and the optical amplifier 335 may be a second optical component, both coupled in parallel to the combiner 337. Both the optical amplifier 333 and the optical amplifier 335 are in-line elements. The combiner 337 is further coupled to other components of the photonic device 330. The optical amplifier 333 and the optical amplifier 335 are examples of redundant components, e.g., the optical component 134, and the optical component 136, as shown in FIG. 1(a). The optical amplifier 333 or the optical amplifier 335 is a redundant component of the photonic device 330, performing the same functions. Only one of the optical amplifier 333 and the optical amplifier 335 is enabled at a time. When the optical amplifier 333 is enabled, the optical amplifier 333 is to provide an input to the combiner 337. When the optical amplifier 335 is enabled, the optical amplifier 335 is to provide the input to the combiner 337.

In embodiments, as shown in FIG. 3(b), the photonic device 370 includes an optical switch 371, an optical switch 373, an optical switch 375, an optical amplifier 372, an optical amplifier 374, an optical amplifier 376, an optical amplifier 378, and a combiner 377. Any two components of the optical amplifier 372, the optical amplifier 374, the optical amplifier 376, and the optical amplifier 378 may be a first optical component and a second optical component. The combiner 377 is further coupled to other components of the photonic device 370. The optical amplifier 372, the optical amplifier 374, the optical amplifier 376, and the optical amplifier 378, are examples of redundant components, e.g., the optical component 134, and the optical component 136, as shown in FIG. 1(a). The optical amplifier 372, the optical amplifier 374, the optical amplifier 376, and the optical amplifier 378 perform the same functions. In some embodiments, only one of the optical amplifier 372, the optical amplifier 374, the optical amplifier 376, and the optical amplifier 378 is enabled at a time. In some other embodiments, there may be multiple lasers being enabled. For example, all but except one of the optical amplifier 372, the optical amplifier 374, the optical amplifier 376, and the optical amplifier 378 may be enabled.

In embodiments, when an amplifier, e.g., the optical amplifier 372, the optical amplifier 374, the optical amplifier 376, or the optical amplifier 378 is defective, the defective amplifier can be disabled and the photonic device 330 or the photonic device 370 still performs the designed functions with full performance. The system using the photonic device 330 or the photonic device 370 continues to operate with full performance. In some other embodiments, the multiple redundant components may be enabled in turn, to reduce the utilization of one component, which leads to extended life for each component and for the system using the photonic device 230 or the photonic device 370. From a reliability perspective the use of four redundant amplifiers would essentially allow this section of the circuit to age at ¼th the rate vs. a non-redundant solution.

Figure 3C:
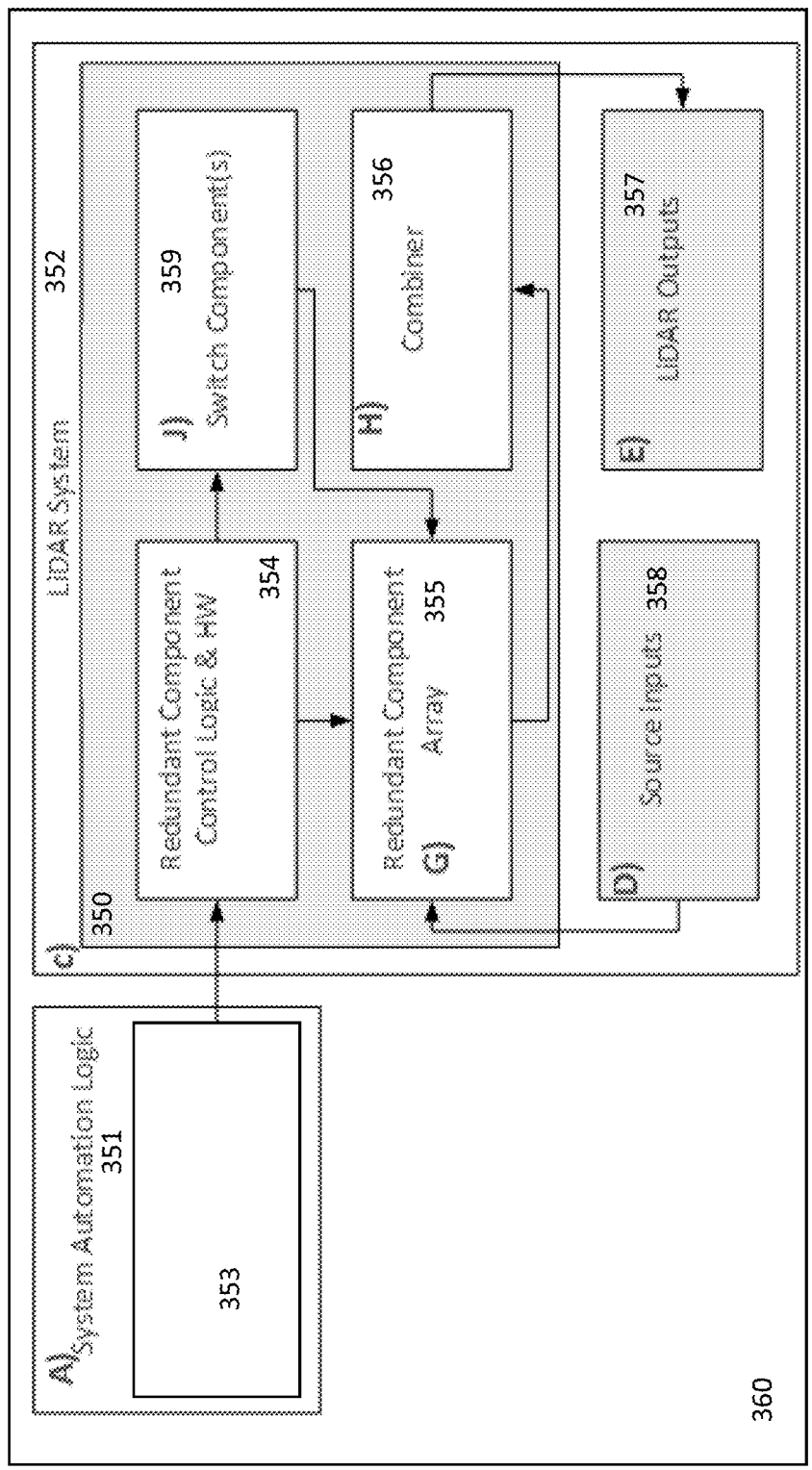

In embodiments, as shown in FIG. 3(c), the monitor unit 353 and the control unit 352 may be a part of an OBU 360 disposed in a CA/AD vehicle. The monitor unit 353 may be a part of a system automation logic 351. The monitor unit 353 is to monitor events and system data for the CA/AD vehicle, e.g., speed, sensor fusion detection data, weather conditions. The control unit 352 is responsible for managing the usage of the redundant components, e.g., control operations of the combiner 337 or the combiner 377. For example, the control unit 352 includes a LiDAR system redundancy control 350, a LiDAR input unit 358, and a LiDAR output unit 357. The LiDAR system redundancy control 350 includes a redundant component control logic 354, a redundant component array control 355, a combiner control 356, and a switch component control unit 359. The redundant component control logic 354 is to select one or more of the redundant components to be enabled. The redundant component array control 355 is to configure the selected component to be enabled. The combiner control 356 is to control the operation of the combiner. The LiDAR output unit 357 is to control the output of the combiner. The LiDAR input unit 358 is to control the input to the optical switches shown in FIGS. 3(a)-3(b), and the switch component control unit 359 is to control operations of the optical switches shown in FIGS. 3(a)-3(b).

Figure 4B:
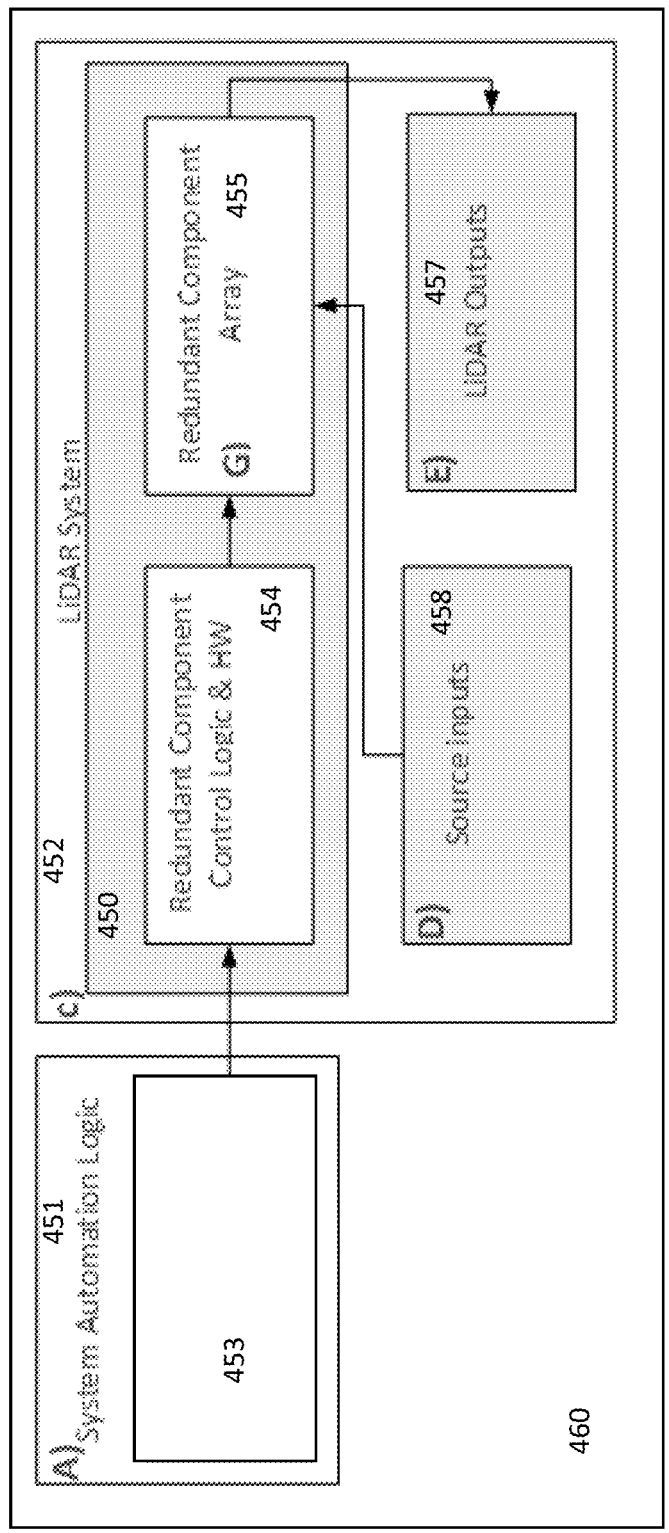

FIGS. 4(a)-4(b) illustrate an example apparatus including a photonic device 430 with redundant components, a monitor unit 453 and a control unit 452 for control operations of the photonic device, in accordance with various embodiments. The photonic device 430, the monitor unit 453, and the control unit 452 may be an example of the photonic device 120, the monitor unit 112, and the control unit 110 as shown in FIG. 1(a).

In embodiments, as shown in FIG. 4(a), the photonic device 430 includes a waveguide diode 431, a waveguide diode 433, and a waveguide diode 435, coupled in a sequence. Any two components of the waveguide diode 431, the waveguide diode 433, and the waveguide diode 435 may be a first optical component and a second optical component. The waveguide diode 431, the waveguide diode 433, and the waveguide diode 435 are examples of redundant components, e.g., the optical component 134, and the optical component 136 of in-line elements, as shown in FIG. 1(a). The waveguide diode 431, the waveguide diode 433, or the waveguide diode 435 is a redundant component of the photonic device 430, performing the same functions. In some embodiments, only one of the waveguide diode 431, the waveguide diode 433, and the waveguide diode 435 is enabled at a time. Each of the waveguide diodes is arranged to allow a light to pass when it is disabled. The serial configuration for the waveguide diode 431, the waveguide diode 433, and the waveguide diode 435 eliminates the need for optically switched inputs to the array of three waveguide diodes, and also eliminates the need for combiners at the output. However, some components may see some undesirable effects from a serial configuration such as back reflection, increased line width, signal losses, etc.

In embodiments, as shown in FIG. 4(b), the monitor unit 453 and the control unit 452 may be a part of an OBU 460 disposed in a CA/AD vehicle. The monitor unit 453 may be a part of a system automation logic 451. The monitor unit 453 is to monitor events and system data for the CA/AD vehicle, e.g., speed, sensor fusion detection data, weather conditions. The control unit 452 is responsible for managing the usage of the redundant components, e.g., control operations of the waveguide diode 431, the waveguide diode 433, and the waveguide diode 435. For example, the control unit 452 includes a LiDAR system redundancy control 450, a LiDAR input unit 458, and a LiDAR output unit 457. The LiDAR system redundancy control 450 includes a redundant component control logic 454 and a redundant component array control 455. The redundant component control logic 454 is to select one or more of the redundant components to be enabled. The redundant component array control 455 is to configure the selected component to be enabled. The LiDAR input unit 458 is to control the input shown in FIG. 4(a).

Figure 5A:
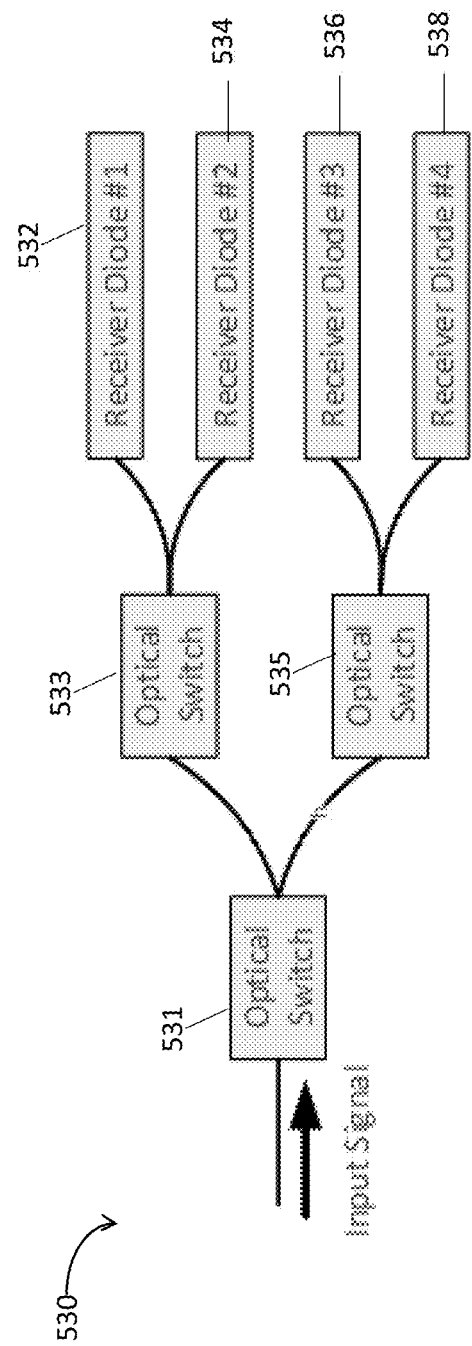
FIGS. 5(a)-5(b) illustrate an example apparatus including a photonic device with redundant components, a monitor unit and a control unit for control operations of the photonic device, in accordance with various embodiments.
Figure 5B:
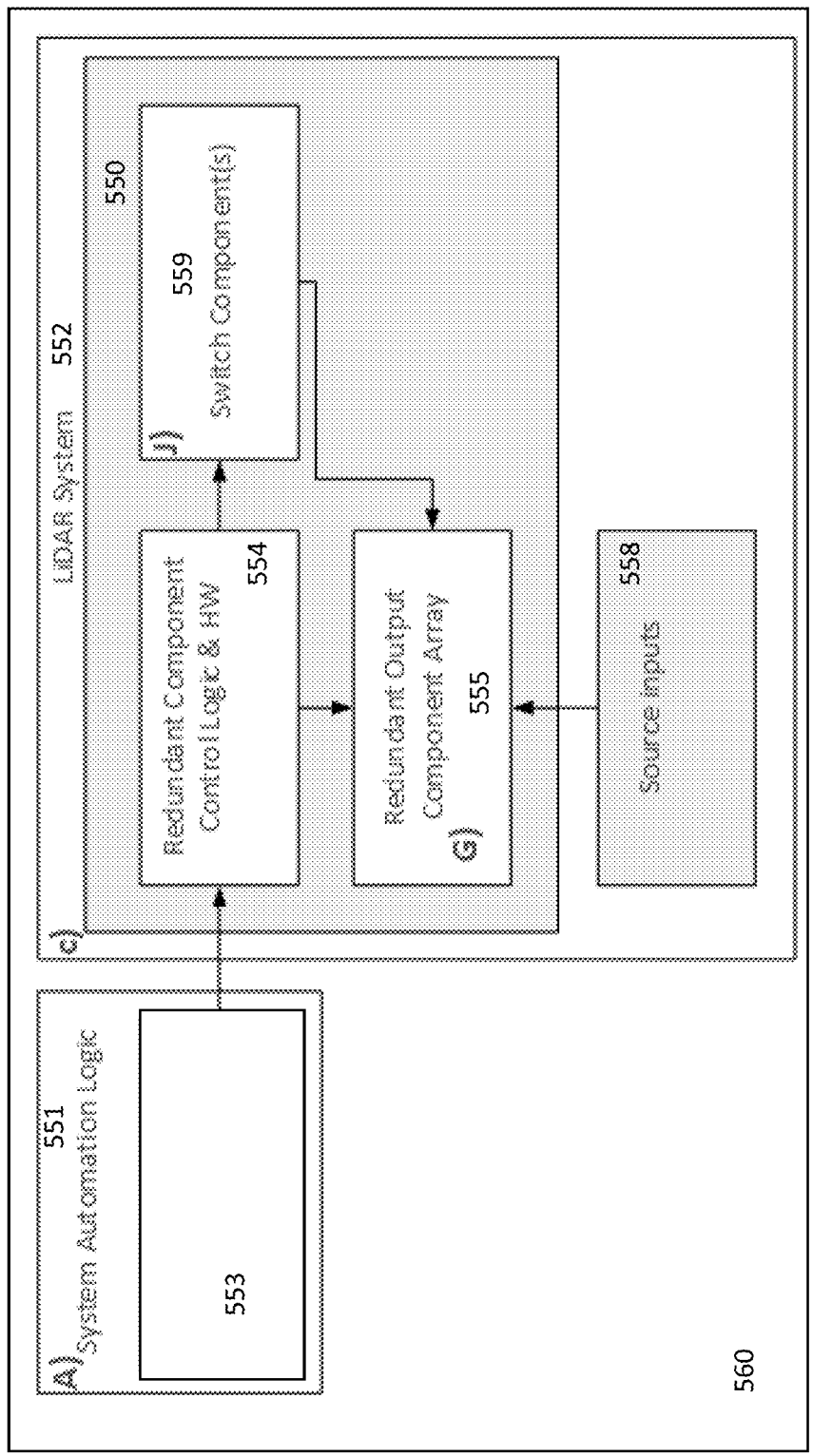

FIGS. 5(a)-5(b) illustrate an example apparatus including a photonic device 530 with redundant components, a monitor unit 553 and a control unit 552 for control operations of the photonic device, in accordance with various embodiments. The photonic device 530, the monitor unit 553, and the control unit 552 may be an example of the photonic device 120, the monitor unit 112, and the control unit 110 as shown in FIG. 1(a).

In embodiments, as shown in FIG. 5(a), the photonic device 530 includes an optical switch 531, an optical switch 533, an optical switch 535, a receiver diode 532, a receiver diode 534, a receiver diode 536, and a receiver diode 538, where the multiple receiver diodes are arranged in parallel. Any two components of the receiver diode 532, the receiver diode 534, the receiver diode 536, and the receiver diode 538 may be a first optical component and a second optical component. The receiver diode 532, a receiver diode 534, a receiver diode 536, and a receiver diode 538 are examples of redundant components, e.g., the optical component 143, and the optical component 145 of termination elements, as shown in FIG. 1(a). The receiver diode 532, the receiver diode 534, the receiver diode 536, or the receiver diode 538 is a redundant component of the photonic device 530, performing the same functions. In some embodiments, only one of the receiver diode 532, the receiver diode 534, the receiver diode 536, and the receiver diode 538 is enabled at a time. In some other embodiments, there may be multiple receiver diodes are enabled at the same time.

In embodiments, as shown in FIG. 5(b), the monitor unit 553 and the control unit 552 may be a part of an OBU 560 disposed in a CA/AD vehicle. The monitor unit 553 may be a part of a system automation logic 551. The monitor unit 553 is to monitor events and system data for the CA/AD vehicle, e.g., speed, sensor fusion detection data, weather conditions. The control unit 552 is responsible for managing the usage of the redundant components, e.g., control operations of the receiver diode 532, the receiver diode 534, the receiver diode 536, and the receiver diode 538. For example, the control unit 552 includes a LiDAR system redundancy control 550, and a LiDAR input unit 558. The LiDAR system redundancy control 550 includes a redundant component control logic 554 a redundant component array control 555, and further includes a switch component control unit 559. The redundant component control logic 554 is to select one or more of the redundant components to be enabled. The redundant component array control 555 is to configure the selected component to be enabled. The switch component control unit 559 is to control operations of the optical switches shown in FIG. 5(a). The LiDAR input unit 558 is to control the input shown in FIG. 5(a).

In embodiments, the photonic device 230, the photonic device 270, the photonic device 330, the photonic device 370, the photonic device 430, and the photonic device 530, shown in FIGS. 2(a)-2(c), FIGS. 3(a)-3(c), FIGS. 4(a)-4(b), or FIGS. 5(a)-5(b), are for examples only and are not limiting. For example, redundancy implementation does not need to be limited to a single component type, e.g., lasers, amplifiers, photo diodes, or any other optical components, within a design. Multiple component types within the design can be used in redundancy arrays of the photonic device. For example, an embodiment includes the laser 271, the laser 273, the laser 275, and the laser 277, and further includes the optical amplifier 372, the optical amplifier 374, the optical amplifier 376, and the optical amplifier 378. Accordingly, the control unit will be updated to include the corresponding units to control operations of the redundant components.

Figure 6:
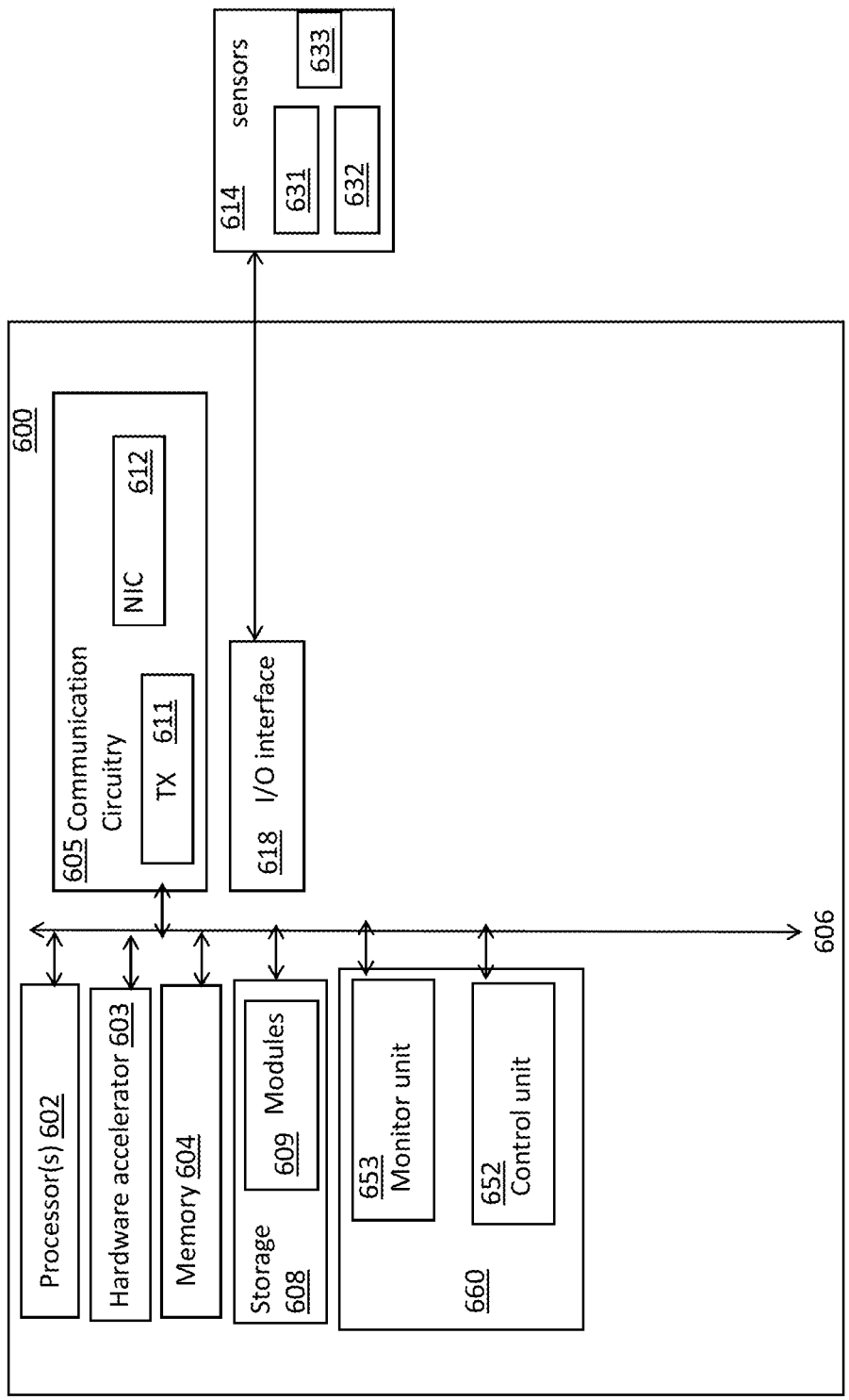
FIG. 6 illustrates an example computer device suitable for use to practice various aspects of the present disclosure, in accordance with various embodiments.

FIG. 6 illustrates an example computer device 600 that may be suitable as a device to practice selected aspects of the present disclosure. The device 600 may be incorporated with the apparatus 100, the apparatus 170, the OBU 260, the OBU 360, the OBU 460, or the OBU 560, as shown in FIGS. 1(a)-1(b), FIGS. 2(a)-2(c), FIGS. 3(a)-3(c), FIGS. 4(a)-4(b), or FIGS. 5(a)-5(b).

As shown, the device 600 may include one or more processors 602, each having one or more processor cores, or and optionally, a hardware accelerator 603 (which may be an ASIC or a FPGA). In alternate embodiments, the hardware accelerator 603 may be part of processor 602, or integrated together on a SOC. Additionally, the device 600 may include a memory 604, which may be any one of a number of known persistent storage medium, and a data storage circuitry 608 including modules 609. In addition, the 600 may include an input/output interface 618, coupled to one or more sensors 614. Furthermore, the device 600 may include communication circuitry 605 including a transceiver (Tx) 611, and network interface controller (NIC) 612. The elements may be coupled to each other via system bus 606, which may represent one or more buses. In the case of multiple buses, they may be bridged by one or more bus bridges (not shown).

In addition, the device 600 may include a monitor unit 653, a control unit 652, which are a part of an OBU 660. The sensor 614 includes a first optical component 631, a second optical component 632, and a third component 633. The first optical component 631 or the second optical component 632 is a redundant component of the sensor 614. The first optical component 631 and the second optical component 632 may be coupled in parallel or in sequence. The monitor unit 653, the control unit 652, and the sensor 614 are examples of the monitor unit 112, the control unit 110, and the photonic device 120 as shown in FIG. 1(a).

In embodiments, the processor(s) 602 (also referred to as "processor circuitry 602") may be one or more processing elements configured to perform basic arithmetical, logical, and input/output operations by carrying out instructions. Processor circuitry 602 may be implemented as a standalone system/device/package or as part of an existing system/device/package. The processor circuitry 602 may be one or more microprocessors, one or more single-core processors, one or more multi-core processors, one or more multi-threaded processors, one or more GPUs, one or more ultra-low voltage processors, one or more embedded processors, one or more DSPs, one or more FPDs (hardware accelerators) such as FPGAs, structured ASICs, programmable SoCs (PSoCs), etc., and/or other processor or processing/controlling circuit. The processor circuitry 602 may be a part of a SoC in which the processor circuitry 602 and other components discussed herein are formed into a single IC or a single package. As examples, the processor circuitry 602 may include one or more Intel Pentium®, Core®, Xeon®, Atom®, or Core M® processor(s); Advanced Micro Devices (AMD) Accelerated Processing Units (APUs), Epyc®, or Ryzen® processors; Apple Inc. A series, S series, W series, etc. processor(s); Qualcomm Snapdragon® processor(s); Samsung Exynos® processor(s); and/or the like.

In embodiments, the processor circuitry 602 may include a sensor hub, which may act as a coprocessor by processing data obtained from the one or more sensors 614. The sensor hub may include circuitry configured to integrate data obtained from each of the one or more sensors 614 by performing arithmetical, logical, and input/output operations. In embodiments, the sensor hub may capable of timestamping obtained sensor data, providing sensor data to the processor circuitry 602 in response to a query for such data, buffering sensor data, continuously streaming sensor data to the processor circuitry 602 including independent streams for each sensor of the one or more sensors 614, reporting sensor data based upon predefined thresholds or conditions/triggers, and/or other like data processing functions.

In embodiments, the memory 604 (also referred to as "memory circuitry 604" or the like) may be circuitry configured to store data or logic for operating the computer device 600. The memory circuitry 604 may include number of memory devices may be used to provide for a given amount of system memory. As examples, the memory circuitry 604 can be any suitable type, number and/or combination of volatile memory devices (e.g., random access memory (RAM), dynamic RAM (DRAM), static RAM (SAM), etc.) and/or non-volatile memory devices (e.g., read-only memory (ROM), erasable programmable read-only memory (EPROM), electrically erasable programmable read-only memory (EEPROM), flash memory, anti-fuses, etc.) that may be configured in any suitable implementation as are known. In various implementations, individual memory devices may be formed of any number of different package types, such as single die package (SDP), dual die package (DDP) or quad die package (Q17P), dual inline memory modules (DIMMs) such as microDIMMs or MiniDIMMs, and/or any other like memory devices. To provide for persistent storage of information such as data, applications, operating systems and so forth, the memory circuitry 604 may include one or more mass-storage devices, such as a solid state disk drive (SSDD); flash memory cards, such as SD cards, microSD cards, xD picture cards, and the like, and USB flash drives; on-die memory or registers associated with the processor circuitry 602 (for example, in low power implementations); a micro hard disk drive (HDD); three dimensional cross-point (3D XPOINT) memories from Intel® and Micron®, etc.

Where FPDs are used, the processor circuitry 602 and memory circuitry 604 (and/or data storage circuitry 608) may comprise logic blocks or logic fabric, memory cells, input/output (I/O) blocks, and other interconnected resources that may be programmed to perform various functions of the example embodiments discussed herein. The memory cells may be used to store data in lookup-tables (LUTs) that are used by the processor circuitry 602 to implement various logic functions. The memory cells may include any combination of various levels of memory/storage including, but not limited to, EPROM, EEPROM, flash memory, SRAM, anti-fuses, etc.

In embodiments, the data storage circuitry 608 (also referred to as "storage circuitry 608" or the like), with shared or respective controllers, may provide for persistent storage of information such as modules 609, operating systems, etc. The data storage circuitry 608 may be implemented as solid state drives (SSDs); solid state disk drive (SSDD); serial AT attachment (SATA) storage devices (e.g., SATA SSDs); flash drives; flash memory cards, such as SD cards, microSD cards, xD picture cards, and the like, and USB flash drives; three-dimensional cross-point (3D Xpoint) memory devices; on-die memory or registers associated with the processor circuitry 602; hard disk drives (HDDs); micro HDDs; resistance change memories; phase change memories; holographic memories; or chemical memories; among others. As shown, the data storage circuitry 608 is included in the computer device 600; however, in other embodiments, the data storage circuitry 608 may be implemented as one or more devices separated from the other elements of computer device 600.

In some embodiments, the data storage circuitry 608 may include an operating system (OS) (not shown), which may be a general-purpose operating system or an operating system specifically written for and tailored to the computer device 600. The OS may include one or more drivers, libraries, and/or application programming interfaces (APIs), which may provide program code and/or software components for modules 609 and/or control system configurations to control and/or obtain/process data from the one or more sensors 614.

The modules 609 may be software modules/components used to perform various functions of the computer device 600 and/or to carry out functions of the example embodiments discussed herein. In embodiments where the processor circuitry 602 and memory circuitry 604 includes hardware accelerators (e.g., FPGA cells, the hardware accelerator 603) as well as processor cores, the hardware accelerators (e.g., the FPGA cells) may be pre-configured (e.g., with appropriate bit streams, logic blocks/fabric, etc.) with the logic to perform some functions of the embodiments herein (in lieu of employment of programming instructions to be executed by the processor core(s)). For example, the modules 609 may comprise logic for the corresponding entities discussed with regard to the monitor unit 653, the control unit 652, and the OBU 660.

The components of computer device 600 may communicate with one another over the bus 606. The bus 606 may include any number of technologies, such as a Local Interconnect Network (LIN); industry standard architecture (ISA); extended ISA (EISA); PCI; PCI extended (PCIx); PCIe; an Inter-Integrated Circuit (I2C) bus; a Parallel Small Computer System Interface (SPI) bus; Common Application Programming Interface (CAPI); point to point interfaces; a power bus; a proprietary bus, for example, Intel® Ultra Path Interface (UPI), Intel® Accelerator Link (IAL), or some other proprietary bus used in a SoC based interface; or any number of other technologies. In some embodiments, the bus 606 may be a controller area network (CAN) bus system, a Time-Trigger Protocol (TTP) system, or a FlexRay system, which may allow various devices (e.g., the one or more sensors 614, etc.) to communicate with one another using messages or frames.

The communications circuitry 605 may include circuitry for communicating with a wireless network or wired network. For example, the communication circuitry 605 may include transceiver (Tx) 611 and network interface controller (NIC) 612. Communications circuitry 605 may include one or more processors (e.g., baseband processors, modems, etc.) that are dedicated to a particular wireless communication protocol.

NIC 612 may be included to provide a wired communication link to a network and/or other devices. The wired communication may provide an Ethernet connection, an Ethernet-over-USB, and/or the like, or may be based on other types of networks, such as DeviceNet, ControlNet, Data Highway+, PROFIBUS, or PROFINET, among many others. An additional NIC 612 may be included to allow connect to a second network (not shown) or other devices, for example, a first NIC 612 providing communications to a network over Ethernet, and a second NIC 612 providing communications to other devices over another type of network, such as a personal area network (PAN) including a personal computer (PC) device. In some embodiments, the various components of the device 600, such as the one or more sensors 614, etc. may be connected to the processor(s) 602 via the NIC 612 as discussed above rather than via the I/O circuitry 618 as discussed infra.

The Tx 611 may include one or more radios to wirelessly communicate with a network and/or other devices. The Tx 611 may include hardware devices that enable communication with wired networks and/or other devices using modulated electromagnetic radiation through a solid or non-solid medium. Such hardware devices may include switches, filters, amplifiers, antenna elements, and the like to facilitate the communications over the air (OTA) by generating or otherwise producing radio waves to transmit data to one or more other devices, and converting received signals into usable information, such as digital data, which may be provided to one or more other components of computer device 600. In some embodiments, the various components of the device 600, such as the one or more sensors 614, etc. may be connected to the device 600 via the Tx 611 as discussed above rather than via the I/O circuitry 618 as discussed infra. In one example, the one or more sensors 614 may be coupled with device 600 via a short-range communication protocol.

The Tx 611 may include one or multiple radios that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), and Fifth Generation (5G) New Radio (NR). It can be noted that radios compatible with any number of other fixed, mobile, or satellite communication technologies and standards may be selected. These may include, for example, any Cellular Wide Area radio communication technology, which may include e.g. a 5G communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated. Implementations, components, and details of the aforementioned protocols may be those known in the art and are omitted herein for the sake of brevity.

The input/output (I/O) interface 618 may include circuitry, such as an external expansion bus (e.g., Universal Serial Bus (USB), FireWire, Thunderbolt, PCI/PCIe/PCIx, etc.), used to connect computer device 600 with external components/devices, such as one or more sensors 614, etc. I/O interface circuitry 618 may include any suitable interface controllers and connectors to interconnect one or more of the processor circuitry 602, memory circuitry 604, data storage circuitry 608, communication circuitry 605, and the other components of computer device 600. The interface controllers may include, but are not limited to, memory controllers, storage controllers (e.g., redundant array of independent disk (RAID) controllers, baseboard management controllers (BMCs), input/output controllers, host controllers, etc. The connectors may include, for example, busses (e.g., bus 606), ports, slots, jumpers, interconnect modules, receptacles, modular connectors, etc. The I/O circuitry 618 may couple the device 600 with the one or more sensors 614, etc. via a wired connection, such as using USB, FireWire, Thunderbolt, RCA, a video graphics array (VGA), a digital visual interface (DVI) and/or mini-DVI, a high-definition multimedia interface (HDMI), an S-Video, and/or the like.

The one or more sensors 614 may be any device configured to detect events or environmental changes, convert the detected events into electrical signals and/or digital data, and transmit/send the signals/data to the computer device 600. Some of the one or more sensors 614 may be sensors used for providing computer-generated sensory inputs. Some of the one or more sensors 614 may be sensors used for motion and/or object detection. Examples of such one or more sensors 614 may include, inter alia, charged-coupled devices (CCD), Complementary metal-oxide-semiconductor (CMOS) active pixel sensors (APS), lens-less image capture devices/cameras, thermographic (infrared) cameras, Light Imaging Detection And Ranging (LiDAR) systems, and/or the like. In some implementations, the one or more sensors 614 may include a lens-less image capture mechanism comprising an array of aperture elements, wherein light passing through the array of aperture elements define the pixels of an image. In embodiments, the motion detection one or more sensors 614 may be coupled with or associated with light generating devices, for example, one or more infrared projectors to project a grid of infrared light onto a scene, where an infrared camera may record reflected infrared light to compute depth information.

Some of the one or more sensors 614 may be used for position and/or orientation detection, ambient/environmental condition detection, and the like. Examples of such one or more sensors 614 may include, inter alia, microelectromechanical systems (MEMS) with piezoelectric, piezoresistive and/or capacitive components, which may be used to determine environmental conditions or location information related to the computer device 600. In embodiments, the MEMS may include 3-axis accelerometers, 3-axis gyroscopes, and/or magnetometers. In some embodiments, the one or more sensors 614 may also include one or more gravimeters, altimeters, barometers, proximity sensors (e.g., infrared radiation detector(s) and the like), depth sensors, ambient light sensors, thermal sensors (thermometers), ultrasonic transceivers, and/or the like.

Each of these elements, e.g., one or more processors 602, the hardware accelerator 603, the memory 604, the data storage circuitry 608 including the modules 609, the input/output interface 618, the one or more sensors 614, the communication circuitry 605 including the Tx 611, and the NIC 612, and the system bus 606, may perform its conventional functions known in the art. In addition, they may be employed to store and host execution of programming instructions implementing the operations associated with operations to be performed by an apparatus for computer assisted or autonomous driving, as described in connection with FIGS. 1-5, and/or other functions that provides the capability of the embodiments described in the current disclosure. The various elements may be implemented by assembler instructions supported by processor(s) 602 or high-level languages, such as, for example, C, that can be compiled into such instructions. Operations associated with safety operations and configuration of safety operations not implemented in software may be implemented in hardware, e.g., via hardware accelerator 603.

The number, capability and/or capacity of these elements 602-660 may vary, depending on the number of other devices the device 600 is configured to support. Otherwise, the constitutions of elements 602-665 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module," or "system."

Furthermore, the present disclosure may take the form of a computer program product embodied in any tangible or non-transitory medium of expression having computer-usable program code embodied in the medium. FIG. 7 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 702 may include a number of programming instructions 704. Programming instructions 704 may be configured to enable a device, e.g., device 600, in response to execution of the programming instructions, to perform, e.g., various operations associated with a monitor unit and control unit to control operations of a photonic device having redundant components, as shown in FIGS. 1(a)-1(b), FIGS. 2(a)-2(c), FIGS. 3(a)-3(c), FIGS. 4(a)-4(b), or FIGS. 5(a)-5(b).

In alternate embodiments, programming instructions 704 may be disposed on multiple computer-readable non-transitory storage media 702 instead. In alternate embodiments, programming instructions 704 may be disposed on computer-readable transitory storage media 702, such as, signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment are chosen and described in order to best explain the principles of the disclosure and the practical application, and to enable others of ordinary skill in the art to understand the disclosure for embodiments with various modifications as are suited to the particular use contemplated.

FIG. 8 illustrates an environment 800 in which various embodiments described with references to FIGS. 1-7 may be practiced. Environment 800 includes a CA/AD vehicle 801, a wireless access node 803, and a cloud computing service 805 (also referred to as "cloud 805", "the cloud 805", and the like). The CA/AD vehicle 801 may include the OBU 150, the OBU 260, the OBU 360, the OBU 460, the OBU 560, or the device 600 as shown in FIGS. 1(a)-1(b), FIGS. 2(a)-2(c), FIGS. 3(a)-3(c), FIGS. 4(a)-4(b), FIGS. 5(a)-5(b), or FIG. 6. For illustrative purposes, the following description may be applicable in a two-dimensional (2D) freeway/highway/roadway environment. However, the embodiments described herein may also be applicable to any type of vehicle, such as trucks, buses, motorcycles, boats or motorboats, and/or any other motorized devices.

The CA/AD vehicle 801 may be any type of motorized vehicle or device used for transportation of people or goods, which may be equipped with controls used for driving, parking, passenger comfort and/or safety, etc. The terms "motor", "motorized", etc., as used herein may refer to devices that convert one form of energy into mechanical energy, and may include internal combustion engines (ICE), compression combustion engines (CCE), electric motors, and hybrids (e.g., including an ICE/CCE and electric motor(s)).

The communications circuitry of the vehicle 801 may communicate with the cloud 805 via the wireless access node 803. The wireless access node 803 may be one or more hardware computer devices configured to provide wireless communication services to mobile devices within a coverage area or cell associated with the wireless access node 803. The wireless access node 803 may include a transmitter/receiver (or alternatively, a transceiver) connected to one or more antennas, one or more memory devices, one or more processors, one or more network interface controllers, and/or other like components. The one or more transmitters/receivers may be configured to transmit/receive data signals to/from one or more mobile devices via a link (e.g., link 807). Furthermore, one or more network interface controllers may be configured to transmit/receive with various network elements (e.g., one or more servers within a core network, etc.) over another backhaul connection (not shown). In embodiments, an OBU of the CA/AD vehicle 801 may generate and transmit data to the wireless access node 803 over link 807, and the wireless access node 803 may provide the data to the cloud 805 over backhaul link 809. Additionally, during operation of the an OBU of the CA/AD vehicle 801, the wireless access node 803 may obtain data intended for the OBU of the CA/AD vehicle 801 from the cloud 805 over link 809, and may provide that data to the OBU of the CA/AD vehicle 801 over link 807. The communications circuitry in the CA/AD vehicle 801 may communicate with the wireless access node 803 in accordance with one or more wireless communications protocols as discussed herein.

As an example, the wireless access node 803 may be a base station associated with a cellular network (e.g., an eNB in an LTE network, a gNB in a new radio access technology (NR) network, a WiMAX base station, etc.), an RSU, a remote radio head, a relay radio device, a smallcell base station (e.g., a femtocell, picocell, home evolved nodeB (HeNB), and the like), or other like network element. In embodiments where the wireless access node is a base station, the wireless access node 803 may be deployed outdoors to provide communications for the vehicle 801 when the vehicle 801 is operating at large, for example when deployed on public roads, streets, highways, etc.

In some embodiments, the wireless access node 803 may be a gateway (GW) device that may include one or more processors, communications systems (e.g., including network interface controllers, one or more transmitters/receivers connected to one or more antennas, and the like), and computer readable media. In such embodiments, the GW may be a wireless access point (WAP), a home/business server (with or without radio frequency (RF) communications circuitry), a router, a switch, a hub, a radio beacon, and/or any other like network device. In embodiments where the wireless access node 803 is a GW, the wireless access node 803 may be deployed in an indoor setting, such as a garage, factory, laboratory or testing facility, and may be used to provide communications for while parked, prior to sale on the open market, or otherwise not operating at large.

In embodiments, the cloud 805 may represent the Internet, one or more cellular networks, a local area network (LAN) or a wide area network (WAN) including proprietary and/or enterprise networks, Transfer Control Protocol (TCP)/Internet Protocol (IP)-based network, or combinations thereof. In such embodiments, the cloud 805 may be associated with network operator who owns or controls equipment and other elements necessary to provide network-related services, such as one or more base stations or access points (e.g., wireless access node 803), one or more servers for routing digital data or telephone calls (for example, a core network or backbone network), etc. Implementations, components, and protocols used to communicate via such services may be those known in the art and are omitted herein for the sake of brevity.

In some embodiments, the cloud 805 may be a system of computer devices (e.g., servers, storage devices, applications, etc. within or associated with a data center or data warehouse) that provides access to a pool of computing resources. The term "computing resource" may refer to a physical or virtual component within a computing environment and/or within a particular computer device, such as memory space, processor time, electrical power, input/output operations, ports or network sockets, and the like. In these embodiments, the cloud 805 may be a private cloud, which offers cloud services to a single organization; a public cloud, which provides computing resources to the general public and shares computing resources across all customers/users; or a hybrid cloud or virtual private cloud, which uses a portion of resources to provide public cloud services while using other dedicated resources to provide private cloud services. For example, the hybrid cloud may include a private cloud service that also utilizes one or more public cloud services for certain applications or users, such as providing obtaining data from various data stores or data sources. In embodiments, a common cloud management platform (e.g., implemented as various virtual machines and applications hosted across the cloud 805 and database systems) may coordinate the delivery of data to the OBU of the CA/AD vehicle 801. Implementations, components, and protocols used to communicate via such services may be those known in the art and are omitted herein for the sake of brevity.

Thus, various example embodiments of the present disclosure have been described including, but are not limited to:

Example 1 may include a photonic device, comprising: a first optical component and a second optical component, both coupled to a third component, wherein when the first optical component is enabled, the first optical component is to provide a first input to the third component, or to receive a second input from the third component; and wherein when the second optical component is enabled, the second optical component is to provide the first input to the third component, or to receive the second input from the third component, wherein the first optical component or the second optical component is a redundant component of the photonic device, the first optical component is arranged to perform a function, the second optical component is arranged to perform the same function, and wherein only one of the first optical component or the second optical component is enabled at a time.

Example 2 may include the photonic device of example 1 and/or some other examples herein, wherein the first optical component is enabled and the second optical component is disabled in a first time, and the first optical component is disabled and the second optical component is enabled in a second time different from the first time.

Example 3 may include the photonic device of example 1 and/or some other examples herein, wherein the first optical component is enabled when the second component fails to perform the function.

Example 4 may include the photonic device of example 1 and/or some other examples herein, wherein the first optical component or the second optical component includes a laser, an amplifier, an optical collimator, an optical switch, an optical discriminator, an optical source signal component, an inline optical component, an optical signal termination component, a photo detector, or a photo diode.

Example 5 may include the photonic device of example 1 and/or some other examples herein, further comprising a combiner, wherein the first optical component and the second optical component are coupled to the combiner in parallel, and the combiner is coupled to the third component to provide the first input to the third component.

Example 6 may include the photonic device of example 1 and/or some other examples herein, wherein the first optical component and the second optical component are coupled in sequence, and each is arranged to allow a light to pass when disabled.

Example 7 may include the photonic device of example 1 and/or some other examples herein, wherein the photonic device further includes one or more additional optical components to perform the function of the first optical component, wherein the one or more additional optical components are coupled to the third component to provide the first input to the third component or to receive the second input from the third component, when at least one of the one or more additional optical components is enabled.

Example 8 may include the photonic device of example 7 and/or some other examples herein, wherein all except one of the first optical component, the second optical component, and the one or more additional optical components are disabled at a time.

Example 9 may include the photonic device of example 1 and/or some other examples herein, wherein the first optical component and the second optical component are disposed on a substrate and included in an integrated circuit.

Example 10 may include the photonic device of example 1 and/or some other examples herein, wherein the photonic device is a selected one of a Light Detection and Ranging (LIDAR) sensor, a laser networking product, an optical gyroscope, or a photonics-based metrology.

Example 11 may include the photonic device of example 10 and/or some other examples herein, wherein the photonic device is disposed in a computer assisted or autonomous driving (CA/AD) vehicle, a robot, a drone, or a security system.

Example 12 may include an apparatus for controlling a photonic device, comprising: a monitor unit to monitor one or more operational parameters of one or more optical components of the photonic device, wherein the photonic device includes a first optical component and a second optical component, both coupled to a third component, wherein when the first optical component or the second optical component is enabled, the enabled one of the first and second optical components is to provide a first input to the third component, or to receive a second input from the third component, and wherein the first optical component or the second optical component is a redundant component of the photonic device, the first optical component is arranged to perform a function, the second optical component is arranged to perform the same function, and wherein only one of the first optical component or the second optical component is enabled at a time; and a control unit to control operations of the first optical component or the second optical component.

Example 13 may include the apparatus of example 12 and/or some other examples herein, wherein the one or more operational parameters includes a duration of the one or more optical components being enabled, a temperature of the one or more optical components, a power level of the one or more optical components, or a current value of the one or more optical components.

Example 14 may include the apparatus of example 12 and/or some other examples herein, wherein the control unit is to control operations of the first optical component or the second optical component by controlling power or current supplied to the first optical component or the second optical component, enabling the first optical component or the second optical component, or disabling the first optical component or the second optical component.

Example 15 may include the apparatus of example 12 and/or some other examples herein, wherein the photonic device further comprises a combiner, the first optical component and the second optical component are coupled to the combiner in parallel, and the combiner is coupled to the third component to provide the first input to the third component, and wherein the control unit is to control operations of the combiner.

Example 16 may include the apparatus of example 12 and/or some other examples herein, wherein the control unit is further to switch operations of the first optical component and the second optical component by enabling the first optical component and disabling the second optical component, or disabling the first optical component and enabling the second optical component.

Example 17 may include the apparatus of example 12 and/or some other examples herein, wherein the monitor unit is arranged to assess degradation of the first optical component or the second optical component.

Example 18 may include the apparatus of example 12 and/or some other examples herein, wherein the control unit is further to adaptively balance usage of the first optical component and the second optical component to provide substantially equivalent degradation of the first optical component and the second optical component over a time period.

Example 19 may include the apparatus of example 12 and/or some other examples herein, wherein the control unit is further to detect a failure state of the first optical component or the second optical component, and to enable the second optical component when detecting the failure state of the first optical component.

Example 20 may include the apparatus of example 12 and/or some other examples herein, wherein the control unit is further to control power or current supplied to the first optical component or the second optical component, in response to a trigger event received from the monitor unit or from another device coupled to the control unit.

Example 21 may include the apparatus of example 20 and/or some other examples herein, wherein the photonic device is a LIDAR sensor disposed on a computer assisted or autonomous driving (CA/AD) vehicle, and the trigger event is related to data about the CA/AD vehicle speed, location, sensor fusion detection data, or weather condition; and the apparatus is a vehicle onboard unit (OBU) disposed in the CA/AD vehicle.

Example 22 may include the apparatus of example 12 and/or some other examples herein, wherein the apparatus is the CA/AD vehicle comprising a vehicle onboard unit (OBU).

Example 23 may include one or more non-transitory computer-readable media comprising instructions that cause a vehicle onboard unit (OBU) of a computer assisted or autonomous driving (CA/AD) vehicle, in response to execution of the instructions by the OBU, to: monitor, by a monitor unit, one or more operational parameters of one or more optical components of a LIDAR sensor disposed on the CA/AD vehicle, wherein the LIDAR sensor includes a first optical component and a second optical component coupled to a third component, wherein when the first optical component or the second optical component is enabled, the enabled one of the first and second optical components is to provide a first input to the third component, or to receive a second input from the third component, and wherein the first optical component or the second optical component is a redundant component of the LIDAR sensor, the first optical component is arranged to perform a function, the second optical component is arranged to perform the same function, and wherein only one of the first optical component or the second optical component is enabled at a time; and control, by a control unit, power or current supplied to the first optical component or the second optical component of the LIDAR sensor, in response to a trigger event received from the monitor unit or from another device coupled to the control unit, and wherein the trigger event is related to data about the CA/AD vehicle speed, location, sensor fusion detection data, or weather condition.

Example 24 may include the one or more non-transitory computer-readable media of example 23 and/or some other examples herein, wherein the one or more operational parameters includes a duration of the one or more optical components being enabled, a temperature of the one or more optical components, a power level of the one or more optical components, or a current value of the one or more optical components.

Example 25 may include the one or more non-transitory computer-readable media of example 23 and/or some other examples herein, further comprising instructions that cause the OBU, in response to execution of the instructions by the OBU, to: adaptively balance usage of the first optical component and the second optical component to provide substantially equivalent degradation of the first optical component and the second optical component over a time period; or detect a failure state of the first optical component or the second optical component, and to enable the second optical component when detecting the failure state of the first optical component.

Although certain embodiments have been illustrated and described herein for purposes of description this application is intended to cover any adaptations or variations of the embodiments discussed herein. Therefore, it is manifestly intended that embodiments described herein be limited only by the claims.

What is claimed is:

1. A light detection and ranging (LiDAR) sensor, comprising:
   a first optical component and a second optical component of the LiDAR sensor, both coupled to a third component of the LiDAR sensor, wherein when the first optical component is enabled, the first optical component is to provide a first input to the third component, or to receive a second input from the third component, and wherein the LiDAR sensor is a LiDAR sensor of a LiDAR system that includes a plurality of LiDAR sensors; and
   a fourth optical component and a fifth optical component of the LiDAR sensor, both coupled to the third component or a sixth component of the LiDAR sensor, wherein when the fourth optical component is enabled, the fourth optical component is to provide a third input to the third component or the sixth component, or to receive a fourth input from the third component or the sixth component;
   wherein when the second optical component is enabled, the second optical component is to provide the first input to the third component, or to receive the second input from the third component, wherein the first optical component or the second optical component are redundant components of the LiDAR sensor, the first optical component is arranged to perform a first function, the second optical component is arranged to perform the first function, and wherein only one of the first optical component or the second optical component is enabled at a time;
   wherein, when the fifth optical component is enabled, the fifth optical component is to provide the third input to the third component or the sixth component, or to receive the fourth input from the third component or the sixth component, wherein the fourth optical component or the fifth optical component are redundant components of the LiDAR sensor, the fourth optical component is arranged to perform a second function, the fifth optical component is arranged to perform the second function, and wherein only one of the fourth optical component and the fifth optical component is enabled at a time;
   wherein the first optical component is enabled when the second optical component fails to perform the first function, and wherein the LiDAR sensor, when the first optical component is enabled, is to operate with performance that is the same as performance of the LiDAR sensor when the second optical component is enabled;
   wherein the fourth optical component is enabled when the fifth optical component fails to perform the second function, and wherein the LiDAR sensor, when the fourth optical component is enabled, is to operate with performance that is the same as performance of the LiDAR sensor when the fifth optical component is enabled; and
   wherein the first optical component, the second optical component, the fourth optical component, or the fifth optical component includes an amplifier, an optical collimator, an optical switch, an optical discriminator, or a photo diode.

2. The LiDAR sensor of claim 1, wherein the first optical component is enabled and the second optical component is disabled at a first time, and the first optical component is disabled and the second optical component is enabled at a second time different from the first time.

3. The LiDAR sensor of claim 1, further comprising a combiner, wherein the first optical component and the second optical component are coupled to the combiner in parallel, and the combiner is coupled to the third component to provide the first input to the third component.

4. The LiDAR sensor of claim 1, wherein the first optical component and the second optical component are coupled in sequence, and each is arranged to allow a light to pass when disabled.

5. The LiDAR sensor of claim 1, wherein the LiDAR sensor further includes one or more additional optical components to perform the first function of the first optical component, wherein the one or more additional optical components are coupled to the third component to provide the first input to the third component or to receive the second input from the third component, when at least one of the one or more additional optical components are enabled.

6. The LiDAR sensor of claim 5, wherein all except one of the first optical component, the second optical component, and the one or more additional optical components are disabled at a time.

7. The LiDAR sensor of claim 1, wherein the first optical component and the second optical component are disposed on a substrate and included in an integrated circuit.

8. The LiDAR sensor of claim 1, wherein the LiDAR sensor is disposed in a computer-assisted or autonomous driving (CA/AD) vehicle, a robot, a drone, or a security system.

9. An apparatus for controlling a LiDAR sensor, comprising:
   a monitor unit to monitor one or more operational parameters of one or more optical components of the LiDAR sensor, wherein the LiDAR sensor includes:
     a first optical component of the LiDAR sensor and a second optical component of the LiDAR sensor, both coupled to a third component of the LiDAR sensor; and
     a fourth optical component of the LiDAR sensor and a fifth optical component of the LiDAR sensor, both coupled to the third component or a sixth component of the LiDAR sensor;
   wherein:
     when the first optical component or the second optical component is enabled, the enabled one of the first and second optical components is to provide a first input to the third component, or to receive a second input from the third component;
     when the fourth optical component or the fifth optical component is enabled, the enabled one of the fourth and fifth optical components is to provide a third input to the third component or the sixth component, or to receive a fourth input from the third component or the sixth component;

the first optical component or the second optical component are redundant optical components of one another, the first optical component is arranged to perform a first function, the second optical component is arranged to perform the first function, wherein only one of the first optical component and the second optical component is enabled at a time;

the fourth optical component or the fifth optical component are redundant optical components of one another, the fourth optical component is arranged to perform a second function, the fifth optical component is arranged to perform the second function, wherein only one of the fourth optical component and the fifth optical component is enabled at a time; and wherein the LiDAR sensor is a LiDAR sensor of a LiDAR system that includes a plurality of LiDAR sensors; and a control unit to control operations of the first optical component, the second optical component, the fourth optical component, or the fifth optical component;

wherein:

the first optical component is enabled when the second optical component fails to perform the first function, and wherein the LiDAR sensor, when the first optical component is enabled, is to operate with performance that is the same as performance of the LiDAR sensor_when the second optical component is enabled;

the fourth optical component is enabled when the fifth optical component fails to perform the second function, and wherein the LiDAR sensor, when the fourth optical component is enabled, is to operate with performance that is the same as performance of the LiDAR sensor when the fifth optical component is enabled; and wherein the first optical component, the second optical component, the fourth optical component, or the fifth optical component includes an amplifier, an optical collimator, an optical switch, an optical discriminator, or a photo diode.

10. The apparatus of claim 9, wherein the one or more operational parameters includes a duration of the one or more optical components being enabled, a temperature of the one or more optical components, a power level of the one or more optical components, or a current value of the one or more optical components.

11. The apparatus of claim 9, wherein the control unit is to control operations of the first optical component or the second optical component by controlling power or current supplied to the first optical component or the second optical component, enabling the first optical component or the second optical component, or disabling the first optical component or the second optical component.

12. The apparatus of claim 9, wherein the LiDAR sensor further comprises a combiner, the first optical component and the second optical component are coupled to the combiner in parallel, and the combiner is coupled to the third component to provide the first input to the third component, and wherein the control unit is to control operations of the combiner.

13. The apparatus of claim 9, wherein the control unit is further to switch operations of the first optical component and the second optical component by enabling the first optical component and disabling the second optical component, or disabling the first optical component and enabling the second optical component.

14. The apparatus of claim 9, wherein the monitor unit is arranged to assess degradation of the first optical component or the second optical component.

15. The apparatus of claim 9, wherein the control unit is further to adaptively balance usage of the first optical component and the second optical component to provide substantially equivalent degradation of the first optical component and the second optical component over a time period.

16. The apparatus of claim 9, wherein the control unit is further to control power or current supplied to the first optical component or the second optical component, in response to a trigger event received from the monitor unit or from another device coupled to the control unit.

17. The apparatus of claim 16, wherein the LiDAR sensor is disposed on a computer-assisted or autonomous driving (CA/AD) vehicle, and the trigger event is related to data about the CA/AD vehicle speed, location, sensor fusion detection data, or weather condition; and the apparatus is a vehicle onboard unit (OBU) disposed in the CA/AD vehicle.

18. The apparatus of claim 9, wherein the apparatus is a CA/AD vehicle comprising a vehicle onboard unit (OBU).

19. One or more non-transitory computer-readable media comprising instructions that cause a vehicle onboard unit (OBU) of a computer-assisted or autonomous driving (CA/AD) vehicle, in response to execution of the instructions by the OBU, to:

monitor, by a monitor unit, one or more operational parameters of one or more optical components of a LiDAR sensor disposed on the CA/AD vehicle, wherein the LiDAR sensor is a LiDAR sensor of a LiDAR system of the CA/AD vehicle that includes a plurality of LiDAR sensors, wherein the LiDAR sensor includes:

a first optical component of the LiDAR sensor and a second optical component of the LiDAR sensor coupled to a third component of the LiDAR sensor, wherein when the first optical component or the second optical component is enabled, the enabled one of the first and second optical components is to provide a first input to the third component, or to receive a second input from the third component, and wherein the first optical component and the second optical component are redundant of one another, the first optical component is arranged to perform a first function, the second optical component is arranged to perform the first function, and wherein only one of the first optical component and the second optical component is enabled at a time; and a fourth optical component of the LiDAR sensor and a fifth optical component of the LiDAR sensor, the fourth and fifth optical components coupled to the third component of the LiDAR sensor or a sixth component of the LiDAR sensor, wherein when the fourth optical component or the fifth optical component is enabled, the enabled one of the fourth and fifth optical components is to provide a third input to the third or sixth component, or to receive a fourth input from the third component, and wherein the fourth optical component and the fifth optical component are redundant of one another, the fourth optical component is arranged to perform a second function, the fifth optical component is arranged to perform the second function, and wherein only one of the fourth optical component and the fifth optical component is enabled at a time; and control, by a control unit, power or current supplied to the first optical component, the second optical component, the fourth optical component, or the fifth optical component of the LiDAR sensor, in response to a trigger event received from the monitor unit or from another device coupled to the control unit, and wherein the trigger event is related to data about the CA/AD vehicle speed, location, sensor fusion detection data, or weather condition;

wherein the first optical component is enabled when the second component fails to perform the first function, and wherein performance of the LiDAR sensor when the first optical component is enabled prior to failure of the first optical component is the same as performance of the LiDAR sensor when the second optical component is enabled subsequent to failure of the first optical component;

wherein the fourth optical component is enabled when the fifth component fails to perform the second function, and wherein performance of the LiDAR sensor when the fourth optical component is enabled prior to failure of the fourth optical component is the same as performance of the LiDAR sensor when the fifth optical component is enabled subsequent to failure of the fourth optical component; and wherein the first optical component, the second optical component, the fourth optical component, or the fifth optical component includes an amplifier, an optical collimator, an optical switch, an optical discriminator, or a photo diode.

20. The one or more non-transitory computer-readable media of claim 19, wherein the one or more operational parameters include a duration of the one or more optical components being enabled, a temperature of the one or more optical components, a power level of the one or more optical components, or a current value of the one or more optical components.

21. The one or more non-transitory computer-readable media of claim 19, further comprising instructions that cause the OBU, in response to execution of the instructions by the OBU, to:

adaptively balance usage of the first optical component and the second optical component to provide substantially equivalent degradation of the first optical component and the second optical component over a time period.

22. The LiDAR sensor of claim 1, wherein the LiDAR sensor is to operate with full performance when the first component is enabled, and the LiDAR sensor is to operate with full performance when the second component is enabled.

* * * * *

UNITED STATES PATENT AND TRADEMARK OFFICE
CERTIFICATE OF CORRECTION

PATENT NO. : 11,899,139 B2
APPLICATION NO. : 16/577906
DATED : February 13, 2024
INVENTOR(S) : Jason Garcia Page 1 of 1

It is certified that error appears in the above-identified patent and that said Letters Patent is hereby corrected as shown below:

In the Claims

Column 30
Line 49, Delete "." after the LiDAR

Column 31
Line 31, "sensor_when the..." should read – "sensor when the..." –

Signed and Sealed this
Sixteenth Day of April, 2024

Katherine Kelly Vidal
Director of the United States Patent and Trademark Office